US011108727B2

(12) United States Patent
Qian et al.

(10) Patent No.: US 11,108,727 B2
(45) Date of Patent: Aug. 31, 2021

(54) SYSTEM, METHOD, AND SERVER FOR PLAYING MULTIMEDIA RESOURCE

(71) Applicant: Tencent Technology (Shenzhen) Company Limited, Shenzhen (CN)

(72) Inventors: Kai Qian, Shenzhen (CN); Shuyi Ma, Shenzhen (CN); Xin Yang, Shenzhen (CN); Chaohui Ding, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 139 days.

(21) Appl. No.: 16/112,504

(22) Filed: Aug. 24, 2018

(65) Prior Publication Data
US 2018/0367497 A1 Dec. 20, 2018

Related U.S. Application Data

(63) Continuation-in-part of application No. PCT/CN2017/075306, filed on Mar. 1, 2017.

(30) Foreign Application Priority Data

Mar. 1, 2016 (CN) .......................... 201610115743.2

(51) Int. Cl.
*G06F 15/16* (2006.01)
*H04L 29/08* (2006.01)
(Continued)

(52) U.S. Cl.
CPC ............ *H04L 51/36* (2013.01); *H04L 51/046* (2013.01); *H04L 51/10* (2013.01); *H04L 51/18* (2013.01);
(Continued)

(58) Field of Classification Search
CPC ..... H04L 51/36; H04L 51/18; H04L 67/1097; H04L 67/06; H04L 65/60; H04L 51/10;
(Continued)

(56) References Cited

U.S. PATENT DOCUMENTS 7,769,811 B2 * 8/2010 Heikes .................. H04M 19/04
709/206
8,565,797 B2 * 10/2013 Olague .............. H04N 21/4312
455/466
(Continued)

FOREIGN PATENT DOCUMENTS

CN        1988450 A      6/2007
CN      101090480 A     12/2007
(Continued)

OTHER PUBLICATIONS

Tencent Technology, ISRWO, PCT/CN2017/075306, May 22, 2017, 7 pgs.
(Continued)

*Primary Examiner* — Kevin T Bates
*Assistant Examiner* — Golam Mahmud
(74) *Attorney, Agent, or Firm* — Morgan, Lewis & Bockius LLP

(57) ABSTRACT

A server receives an instant messaging message from a first user account to a second user account, the message includes a download address of a multimedia resource. In response to receiving the instant messaging message, in accordance with a determination that the instant messaging message includes a download address of a multimedia resource, and that the second user account is bound to a network attached storage (NAS) device: the server generates a download instruction in accordance with a command protocol of the NAS device bound to the second user account and sends the download instruction to the NAS device. The NAS device downloads
(Continued)

the multimedia resource in accordance with the download instruction and a playing device plays the multimedia resource by accessing the NAS device.

20 Claims, 13 Drawing Sheets

(51) Int. Cl.
| | |
|---|---|
| G06F 9/445 | (2018.01) |
| H04N 21/436 | (2011.01) |
| H04N 21/647 | (2011.01) |
| H04N 21/858 | (2011.01) |
| H04L 12/58 | (2006.01) |
| H04N 21/488 | (2011.01) |
| H04N 21/438 | (2011.01) |
| H04N 21/258 | (2011.01) |
| H04N 21/472 | (2011.01) |
| H04L 29/06 | (2006.01) |

(52) U.S. Cl.
CPC .............. *H04L 65/60* (2013.01); *H04L 67/06* (2013.01); *H04L 67/1097* (2013.01); *H04N 21/258* (2013.01); *H04N 21/436* (2013.01); *H04N 21/438* (2013.01); *H04N 21/472* (2013.01); *H04N 21/488* (2013.01); *H04L 65/403* (2013.01)

(58) Field of Classification Search
CPC ..... H04L 51/046; H04L 65/403; H04L 51/04; H04N 21/472; H04N 21/258; H04N 21/436; H04N 21/438; H04N 21/488; H04N 21/4882; H04N 21/4788; H04N 21/47202; H04N 21/43615; H04N 21/25808; H04N 21/858; H04N 21/4725
USPC .......................................................... 709/201
See application file for complete search history.

(56) References Cited

U.S. PATENT DOCUMENTS

| | | | | |
|---|---|---|---|---|
| 8,606,684 B2* | 12/2013 | Bi | ........................... | H04L 63/08 |
| | | | | 705/37 |
| 8,607,282 B2* | 12/2013 | Lee | .................. | H04N 21/47202 |
| | | | | 725/87 |
| 8,880,580 B2* | 11/2014 | Simmons | .............. | G06F 16/188 |
| | | | | 709/202 |
| 9,584,612 B2* | 2/2017 | Zheng | ..................... | H04L 67/26 |
| 10,455,275 B2* | 10/2019 | Connelly | .......... | H04N 21/43615 |
| 2004/0107143 A1* | 6/2004 | Niemi | ................. | H04L 65/1006 |
| | | | | 705/26.43 |
| 2006/0279628 A1* | 12/2006 | Fleming | ............. | H04N 21/4223 |
| | | | | 348/143 |
| 2007/0118608 A1* | 5/2007 | Egli | ........................ | G06F 16/958 |
| | | | | 709/217 |
| 2007/0180468 A1* | 8/2007 | Gill | ........................ | G06F 21/10 |
| | | | | 725/45 |
| 2007/0220310 A1* | 9/2007 | Sharma | ............... | H04L 67/1097 |
| | | | | 714/6.12 |
| 2008/0313278 A1* | 12/2008 | Hochberg | ............. | H04L 65/602 |
| | | | | 709/204 |
| 2010/0255890 A1* | 10/2010 | Mikkelsen | ........ | H04L 29/06027 |
| | | | | 455/567 |
| 2011/0173687 A1* | 7/2011 | Willars | .................. | H04L 63/083 |
| | | | | 726/7 |
| 2013/0031192 A1* | 1/2013 | Caspi | .................. | H04L 65/1083 |
| | | | | 709/206 |
| 2013/0080516 A1* | 3/2013 | Bologh | .................. | H04L 69/329 |
| | | | | 709/203 |
| 2013/0254308 A1* | 9/2013 | Rose | ..................... | H04N 21/252 |
| | | | | 709/206 |
| 2016/0094886 A1* | 3/2016 | Lian | ................. | H04N 21/26258 |
| | | | | 725/32 |
| 2016/0309219 A1* | 10/2016 | Zhang | .............. | H04N 21/43615 |

FOREIGN PATENT DOCUMENTS

| | | |
|---|---|---|
| CN | 101188545 A | 5/2008 |
| CN | 102165750 A | 8/2011 |
| CN | 102624967 A | 8/2012 |
| CN | 103067523 A | 4/2013 |
| CN | 103888817 A | 6/2014 |
| CN | 103997660 A | 8/2014 |
| CN | 104023273 A | 9/2014 |
| CN | 104243586 A | 12/2014 |
| CN | 104615700 A | 5/2015 |
| CN | 104717527 A | 6/2015 |
| CN | 104992137 A | 10/2015 |
| CN | 105119918 A | 12/2015 |
| JP | 2007036901 A | 2/2007 |
| WO | WO 2013150763 A1 | 10/2013 |

OTHER PUBLICATIONS

Tencent Technology, IPRP, PCT/CN2017/075306, Sep. 4, 2018, 6 pgs.

* cited by examiner

SYSTEM, METHOD, AND SERVER FOR PLAYING MULTIMEDIA RESOURCE

PRIORITY CLAIMS AND RELATED APPLICATIONS

This application is a continuation-in-part of PCT application number: PCT/CN2017/075306, entitled "SYSTEM, METHOD, AND SERVER for playing MULTIMEDIA RESOURCE", filed with the Chinese Patent Office on Mar. 1, 2017, which claims priority to China Patent Application No. 201610115743.2, filed with the Chinese Patent Office on Mar. 1, 2016 and entitled "SYSTEM, METHOD, AND SERVER FOR PLAYING MULTIMEDIA RESOURCE", both of which are incorporated herein by reference in their entirety.

FIELD OF THE TECHNOLOGY

Embodiments of the present disclosure relate to the field of smart homes, and in particular, to a system, method, and server for playing a multimedia resource.

BACKGROUND OF THE DISCLOSURE

As the number and types of multimedia resources over the network grow continuously, users can play various multimedia resources downloaded from the network. The multimedia resources include at least one of e-books, pictures, audios and videos.

In the related art, a user first looks for a download address of a multimedia resource on the network, and then inputs the found download address to a download tool. The download tool, which may be a download-type application, downloads the multimedia resource according to the download address input by the user. After the multimedia resource is downloaded, the user copies the multimedia resource to a playing device to play the multimedia resource. The playing device may be a smart television.

SUMMARY OF INVENTION

As the multimedia resource played on the playing device needs to be downloaded in advance and copied to the playing device, conventionally, the user can only copy to share the downloaded multimedia resource. After copying the multimedia resource to the playing device, the user further needs to set the playing device to play the multimedia resource. The whole process requires relatively complex operations.

In order to resolve the problem that whole process of downloading a multimedia resource and copying the multimedia resource to a playing device to play the multimedia resource requires relatively complex operations of a user, embodiments of the present disclosure provide a system, method, and server for playing a multimedia resource. An instant messaging platform is used to provide communication interfaces and data package format for communications between both human users, between users and peripheral devices, and between peripheral devices themselves. In addition, the communication between user and device is based on instant messages, rather than machine instructions or other user interface controls displayed on a graphical user interface. As such, the user does not have to be experienced in understanding the specifics of each device that he/she wishes to control or navigate a complex user interface menu or control interface of different devices, which helps to make it easier for people who are less technically savvy or experienced to view online multimedia resources on TV. It also simplifies the infrastructure cost for building customized control translation for each type of resources and peripheral devices. The instant messages of the users that are directed to devices (e.g., NAS devices or the smart TV) are translated or encoded into the appropriate machine instructions by providers (e.g., manufacturers or service providers) of the devices, and the machine instructions are also translated to human readable instant messages, so that the user is made aware of what actions or operations have been performed or are to be performed by the devices. The entire interaction between the user and the devices are streamlined, and reduces confusion, operation error, and the time needed to achieve an intended outcome (e.g., control the NAS device, download the multimedia resources, transfer the files, and play the files on the smart TV) through individual operations of and the cooperation between multiple users and devices, and the network servers.

In one aspect, a method is performed at a server having one or more processors and memory, the server being configured to communicate with a plurality of instant messaging client devices and to support instant messaging among the plurality of instant messaging client devices. The server receives a first instant messaging message sent by a first instant messaging client corresponding to a first user account. The first instant messaging message is addressed to a second instant messaging client corresponding to a second user account that is distinct from the first user account. The first instant messaging message includes a download address of a multimedia resource. In response to receiving the first instant messaging message from the first instant messaging client: the server forwards the first instant messaging message to a second instant messaging client device corresponding to the second user account. In accordance with a determination that the first instant messaging message includes a download address of a multimedia resource, and that the second user account is bound to a network attached storage (NAS) device: the server generates a download instruction according to the download address of the multimedia resource in accordance with a command protocol of the NAS device bound to the second user account. The server sends the download instruction to the NAS device, and the NAS device downloads the multimedia resource in accordance with the download instruction.

According to a second aspect of the present disclosure, a server includes one or more processors, memory, and a plurality of instructions stored in the memory that, when executed by the one or more processors, cause the server to perform the aforementioned method.

According to a third aspect of the present disclosure, a non-transitory computer readable storage medium storing a plurality of instructions configured for execution by a server device having one or more processors, the plurality of instructions causing the server device to perform the aforementioned method.

Details of one or more embodiments of the present disclosure are provided in the following accompanying drawings and descriptions. Other features, objectives, and advantages of the present disclosure become clear in the specification, the accompanying drawings, and the claims.

The technical solutions provided in the embodiments of the present disclosure also bring about the following beneficial effects:

The NAS device obtains a download instruction of a multimedia resource, and downloads the multimedia resource according to the download instruction; the playing device receives and displays a notification message, and plays the multimedia resource according to a storage path when a view entry in the notification message is triggered. Therefore, the present disclosure resolves the problem of complex operations when a user shares a multimedia resource, and achieves the effects of automatically notifying a playing device of the user after the multimedia resource is downloaded so that the playing device of the user can play the multimedia resource more conveniently, and simplifying repeated operations of downloading and copying the multimedia resource by the user.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show only some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes the present disclosure in detail with reference to the accompanying drawings.

Figure 1:
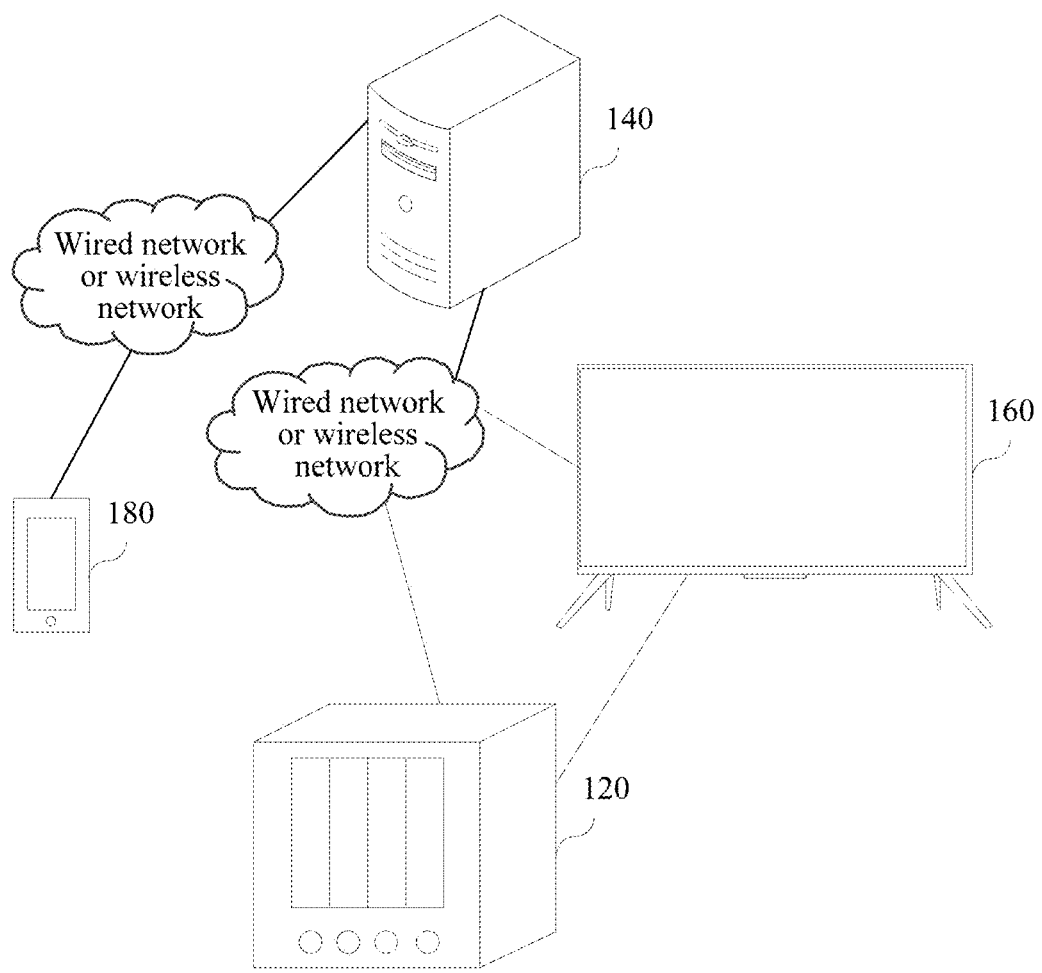
FIG. 1 is a schematic diagram of a system for playing a multimedia resource according to some exemplary embodiments.

Refer to FIG. 1, which is a schematic structural diagram of a system for playing a multimedia resource according to an embodiment of the present disclosure. The implementation environment includes: a NAS device 120, a server 140, and a playing device 160.

The NAS device 120 is capable of storing data and transmitting data. In some embodiments, the NAS device 120 is further capable of automatically searching for a download address of a multimedia resource, and is further capable of downloading the multimedia resource remotely. In some embodiments, an operating system is further installed in the NAS device 120.

The server 140 is a backend server of a third-party application, and may be one server, a server cluster consisting of multiple servers, or a cloud computing center. The server 140 stores a binding relationship between the NAS device 120 and the playing device 160.

In some embodiments, the third-party application includes at least one of a communication-type application such as WeChat or QQ, and an application that provides a service corresponding to the NAS device.

The playing device 160 is capable of playing a multimedia resource, and for example, is at least one of a television, a mobile phone, a computer, and a projector.

The NAS device 120 is connected to the server 140 by means of a wireless network or a wired network.

Generally, the NAS device 120 and the playing device 160 are located in a same local area network, or the NAS device 120 is bound to the playing device 160, or the NAS device 120 and the playing device 160 are bound to a same instant messaging account.

The server 140 is connected to the playing device 160 by means of a wireless network or a wired network.

In some embodiments, the system for playing a multimedia resource further includes a terminal 180. The terminal 180 is capable of transmitting data, and for example, is a mobile phone or a tablet computer. A communication-type application, also known as an instant messaging client, is installed in the terminal 180. The "third party" here is term relative to a producer of the terminal, and does not necessarily mean that the third party and the producer belong to different owners. The third party and the producer may also belong to different servers of a same owner.

In some embodiments, the server 140 is connected to the terminal 180 by means of a wireless network or a wired network.

Figure 2:
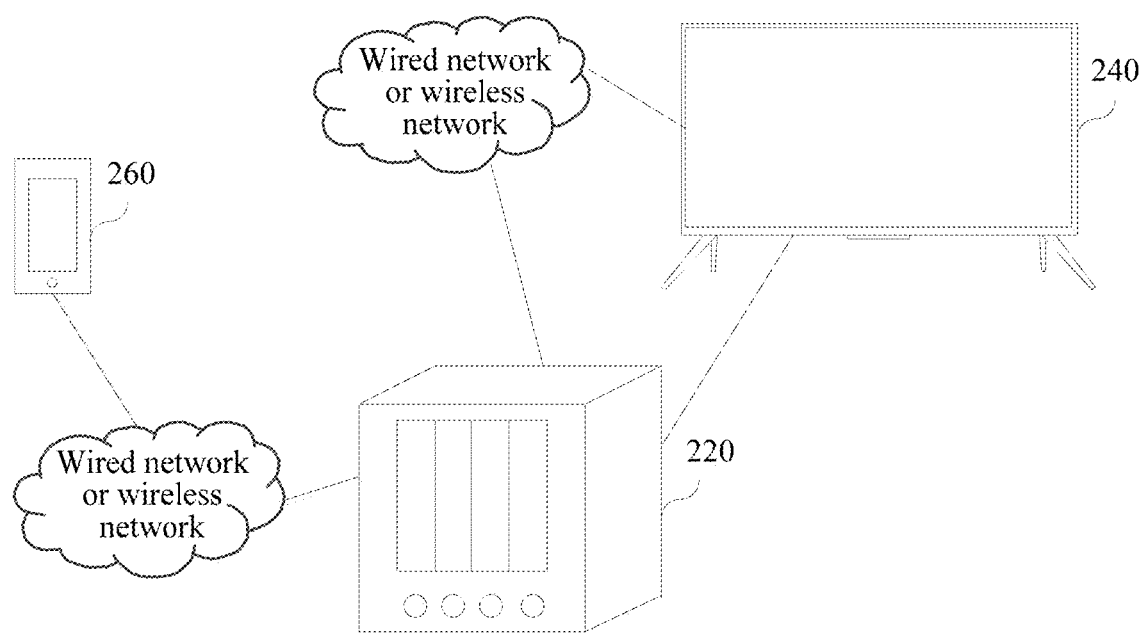
FIG. 2 is a schematic diagram of another system for playing a multimedia resource according to some exemplary embodiments.

Refer to FIG. 2, which is a schematic diagram of another system for playing a multimedia resource according to an embodiment of the present disclosure. The system includes: a NAS device 220 and a playing device 240.

The NAS device 220 is capable of storing data and transmitting data. In some embodiments, the NAS device 220 is further capable of automatically searching for a download address of a multimedia resource, and is further capable of downloading the multimedia resource remotely. In some embodiments, an operating system is further installed in the NAS device 220.

The playing device 240 is capable of playing a multimedia resource, and for example, is a television, a mobile phone, or a computer.

The NAS device 220 and the playing device 240 are located in a same local area network, or the NAS device 220 is bound to (e.g., registered to the server of the instant messaging platform as associated devices under the same user account on the instant messaging platform, e.g., a storage device for a playing device with read and/or write privileges on the storage device) the playing device 240.

In some embodiments, the system for playing a multimedia resource further includes a terminal 260 capable of transmitting data, for example, a mobile phone or a tablet computer. An application that provides a service corresponding to the NAS device is installed in the terminal 260.

In some embodiments, the terminal 260 and the NAS device 220 are connected by means of a wireless network or a wired network.

Figure 3:
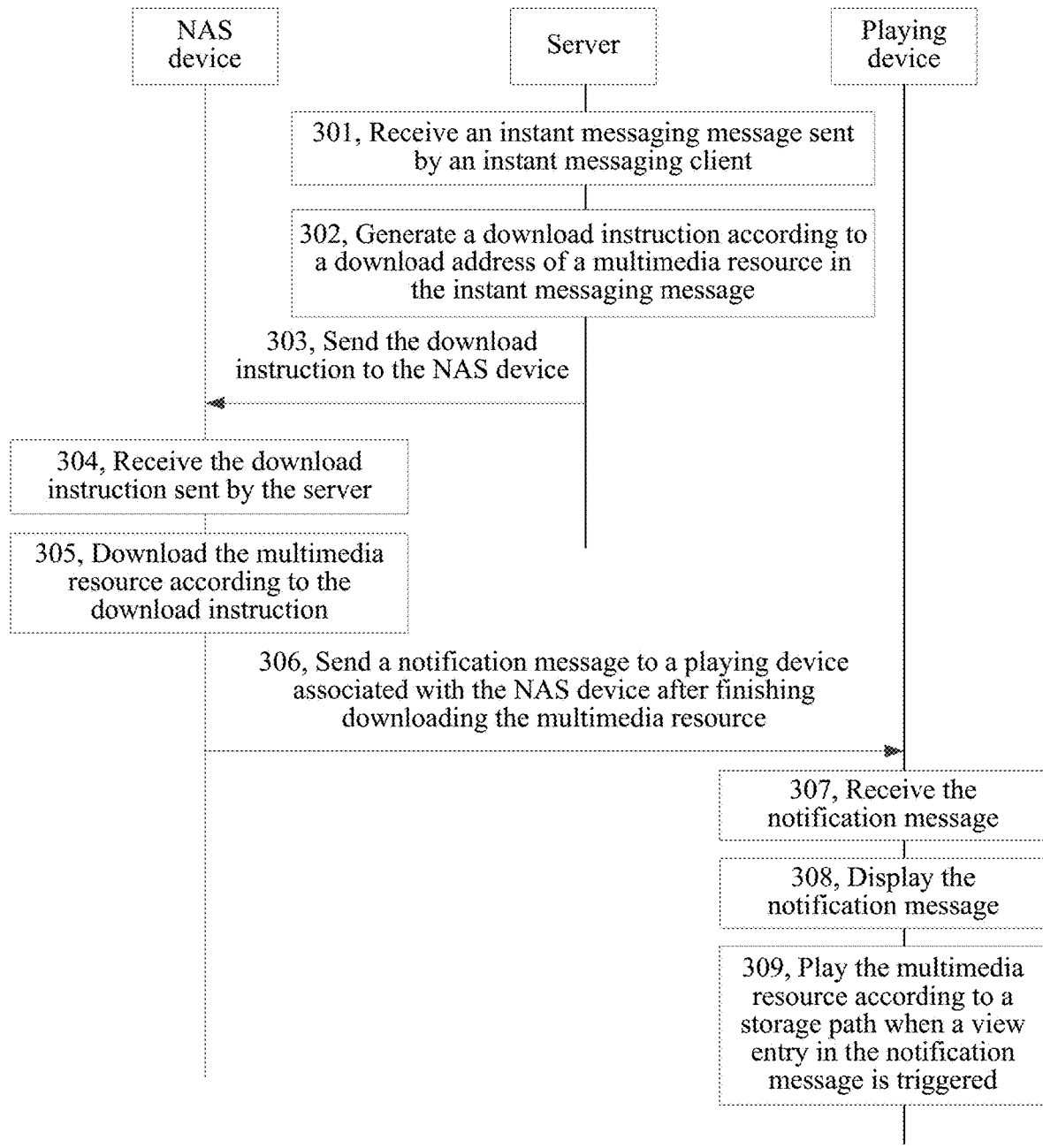
FIG. 3 is a flowchart of a method for playing a multimedia resource according to an exemplary embodiment.

Refer to FIG. 3, which is a flowchart of a method for playing a multimedia resource according to an exemplary embodiment of the present disclosure. The method for playing a multimedia resource being applied to the implementation environment shown in FIG. 1 is used as an example to describe this embodiment. The method for playing a multimedia resource includes the following steps:

In step 301, a server receives an instant messaging message sent by an instant messaging client, the instant messaging message including a download address of a multimedia resource, and the instant messaging client having a binding relationship with a NAS device (e.g., the NAS device is registered under the user account associated with the instant messaging client on the instant messaging platform, and the owner of the user account has granted read/write access to the instant messaging client during registration of the NAS device on the instant messaging platform).

In step 302, the server generates a download instruction according to the download address of the multimedia resource in the instant messaging message. In some embodiments, the download instruction is generated in accordance with the instruction format of the NAS device that is registered with the instant messaging platform under the user account. In some embodiments, the server parses the download address and generates a number of instructions, including instructions for carrying out necessary authentication steps at the server providing the multimedia resources, instruction for downloading the multimedia resources, instruction for storing the downloaded multimedia resources locally at the NAS device, and instructions for generating the prompt on a smart TV associated with the same user account regarding playback of the downloaded multimedia resources.

In some embodiments, the download instruction is used for downloading the multimedia resource. In some embodiments, the download instruction carries the download address of the multimedia resource. In some embodiments, the download instruction further carries at least one of the following information: a download time, a download save path, a download file name, and an instant messaging account.

In step 303, the server sends the download instruction (e.g., along with other instructions generated in response to the instant message) to the NAS device.

In step 304, the NAS device receives the download instruction (e.g., along with other instructions generated in response to the instant message) sent by the server.

In step 305, the NAS device downloads the multimedia resource according to the download instruction (and optionally, performs other instructions that were generated in response to the instant message by the server)).

In some embodiments, the multimedia resource includes at least one of an e-book, a picture, an audio, and a video.

In step 306, the NAS device sends a notification message to a playing device associated with the NAS device (e.g., in accordance with the instruction received from the server that was generated in response to the instant message) after finishing downloading the multimedia resource, the notification message including a storage path and a view entry of the multimedia resource in the NAS device. The playing device and the NAS device have mutual read and/or write access in accordance with registration configuration established at the registration of the playing device and the NAS device under the same user account of the instant messaging client by the user of the user account.

In some embodiments, the notification message is displayed in the form of a popup message, an unread message, or an unread email.

In step 307, the playing device receives the notification message.

In step 308, the playing device displays the notification message.

In step 309, the playing device plays the multimedia resource according to the storage path when the view entry is triggered.

To sum up, according to the method for playing a multimedia resource provided by this embodiment of the present disclosure, the NAS device obtains a download instruction of the multimedia resource, and downloads the multimedia resource according to the download instruction; the playing device receives and displays a notification message, and plays the multimedia resource according to a storage path when a view entry in the notification message is triggered. Therefore, the method resolves the problem of complex operations when a user shares a multimedia resource, and achieves the effects of automatically notifying a playing device of the user after the multimedia resource is downloaded so that the playing device of the user can play the multimedia resource more conveniently, and simplifying repeated operations of downloading and copying the multimedia resource by the user.

Refer to FIG. 4, which is a flowchart of a method for playing a multimedia resource according to another exemplary embodiment of the present disclosure. The method for playing a multimedia resource being applied to the implementation environment shown in FIG. 1 is used as an example to describe this embodiment. The method for playing a multimedia resource includes the following steps:

In step 401, a NAS device establishes a binding relationship in a server with a playing device, or the NAS device and the playing device are bound in the server to a same instant messaging account.

In some embodiments, the binding relationship is an association relationship or a friend relationship. For example, the NAS device and the playing device each receives a user name, and the user names are listed in the listing of contacts of the user, and can be shared with another user over the instant messaging platform via the same way that a human user can be introduced and connected on the instant messaging platform (e.g., by sharing a contact card corresponding to the NAS device or the playing device by an owner of the devices (e.g., the user account that the devices are registered under), and the receiving user receives access privileges of the NAS device or playing device over the instant messaging platform and can control download, storage, and playback of multimedia files on these devices using instant messages directed to these devices, rather than using a control user interface or machine instructions for the devices).

For example, establishing a binding relationship can be considered as establishing an association relationship between the NAS device and the playing device. In some embodiments, that the NAS device establishes a binding relationship in a server with a playing device can be interpreted as associating an identifier of the NAS device with an identifier of the playing device by using an operating system of the NAS device or a user client corresponding to the NAS device, and storing the association relationship between the identifier of the NAS device and the identifier of the playing device in the server.

In some embodiments, the identifier of the NAS device is marked on the surface of the NAS device in the form of a graphic code, or the identifier of the NAS device is a unique character string. Likewise, the identifier of the playing device is marked on the surface of the playing device in the form of a graphic code, or the identifier of the playing device is a unique character string.

The NAS device and the playing device added to a same instant messaging account are bound to the same instant messaging account.

Any instant messaging account to which the NAS device is added can be considered as having a binding relationship with the NAS device. However, in general cases, if one NAS device is bound to multiple instant messaging accounts, only one instant messaging account among the multiple different instant messaging accounts bound to the NAS device has an administration privilege over the NAS device, while other instant messaging accounts only have the right of using the NAS device. Likewise, any instant messaging account to which the playing device is added can be considered as having a binding relationship with the playing device. However, if multiple instant messaging accounts are bound to a same NAS device, only one instant messaging account among the multiple different instant messaging accounts bound to the playing device has an administration privilege over the playing device, while other instant messaging accounts are only capable of using the playing device. The binding relationship can be a friend relationship or an association relationship in different embodiments.

In some embodiments, the graphic code corresponding to the identifier may be scanned to add the NAS device or the playing device to the instant messaging account. Alternatively, the identifier character string may be added manually to add the NAS device or the playing device. That is, an instant messaging client on which the instant messaging account is logged into has a graphic code scanning function. The instant messaging client scans the graphic code of the NAS device or the playing device to obtain the identifier of the NAS device or the playing device and further binding the NAS device or the playing device.

In some embodiments, one NAS device may establish binding relationships with multiple playing devices. One playing device may establish binding relationships with multiple NAS devices. A same NAS device may be bound to multiple different instant messaging accounts.

In some embodiments, one NAS device and multiple playing devices may be bound to a same instant messaging account. For example, the instant messaging account is XYZKLM; one NAS device and two playing devices TV1 and TV2 are bound to the instant messaging account, as shown in FIG. 4B.

Correspondingly, the playing device also establishes a binding relationship in the server with the NAS device, or the playing device and the NAS device are bound in the server to a same instant messaging account.

It should be noted that, this embodiment does not limit the sequence of executing this step. This step may also be executed before step 403, or executed before step 404, or executed before step 405, or executed before step 406.

In step 402, the server receives an instant messaging message sent by an instant messaging client.

The instant messaging message includes a download address of the multimedia resource, and the instant messaging client has a binding relationship with the NAS device.

In some embodiments, the instant messaging account logged into by the user on the instant messaging client is bound to the NAS device. The user opens a dialog box corresponding to the NAS device in the instant messaging client, and inputs the download address of the multimedia resource in the dialog box. The instant messaging client sends an instant messaging message including the download address of the multimedia resource to the server, so that the server sends a download instruction to the NAS device. As shown in FIG. 4C, the user opens a dialog box 41 corresponding to the NAS device in the instant messaging client, inputs the download address "Aawnmlk.ooo.ii12" of the multimedia resource in a message input box 42, and clicks a "send" option 43. The instant messaging client sends an instant messaging message including the download address of the multimedia resource to the server. The download address in the figure is not a real address, but merely an example for description.

The server receives the instant messaging message sent by the instant messaging client.

In step 403, the server generates a download instruction according to a download address of a multimedia resource in the instant messaging message.

The server parses the download address in the instant messaging message, and generates a download instruction according to the parsed out download address.

In some embodiments, the download instruction is used for downloading the multimedia resource. In some embodiments, the download instruction carries the download address of the multimedia resource. In some embodiments, the download instruction further carries at least one of the following information: a download time, a download save path, a download file name, and an instant messaging account. The download time and/or download save path may be a default value.

For example, the server assumes by default that the download is started at 12:00 at night, to avoid interfering with normal network use of the user. For another example, when the multimedia resource is a picture, the server sets path 1 as the download save path by default; when the multimedia resource is a video, the server sets path 2 as the download save path by default.

In step 404, the server sends the download instruction to the NAS device.

The server sends the download instruction to the NAS device having a binding relationship with the instant messaging client.

In step 405, the NAS device receives the download instruction sent by the server.

In step 406, the NAS device downloads the multimedia resource according to the download instruction.

In some embodiments, the NAS device parses the download instruction to extract the download address and other download parameters in the download instruction.

The NAS downloads the multimedia resource according to the download address of the multimedia resource in the download instruction. The multimedia resource downloaded by the NAS device is stored in a storage region of the NAS device.

In some embodiments, the NAS device uses a backend resource server, for example, an offline download service or a high-speed channel service provided by the backend resource server, to assist in download of the multimedia resource according to the download instruction.

In some embodiments, the NAS device uses a download service in a local operating system to download the multimedia resource according to the download instruction.

In step 407, the NAS device sends a download completion instruction to the server after finishing downloading the multimedia resource.

In some embodiments, the download completion instruction includes a storage path of the multimedia resource in the NAS device, and the multimedia resource is downloaded by the NAS device according to the download instruction.

In step 408, the server receives the download completion instruction sent by the NAS device.

In step 409, the server searches for a playing device associated with the NAS device.

The playing device associated with the NAS device includes at least one of a playing device located in a same local area network with the NAS device, a playing device bound to the NAS device, and a playing device bound to a same instant messaging account as the NAS device. That is, the playing device associated with the NAS device is a playing device located in a same local area network with the NAS device, or a playing device bound to the NAS device, or a playing device bound to a same instant messaging account as the NAS device, or a playing device bound to the NAS device and a playing device located in a same local area network with the NAS device, or a playing device located in a same local area network with the NAS device and a playing device bound to a same instant messaging account as the NAS device, or a playing device located in a same local area network with the NAS device, a playing device bound to the NAS device, and a playing device bound to a same instant messaging account as the NAS device.

It is assumed that the server finds three playing devices associated with the NAS device, and association relationships are shown in the table below:

| Playing device | Association relationship |
| --- | --- |
| TV | Located in a same local area network as the NAS device |
| Pad_a | Bound to the NAS device |
| Mobile_b | Bound to a same instant messaging account as the NAS device |

In step 410, the server sends a notification message to the found playing device.

In some embodiments, the notification message includes: a storage path and a view entry of the multimedia resource, and the multimedia resource is downloaded by the NAS device according to the download instruction.

The server sends the notification message to all found playing devices associated with the NAS device; or the server sends the notification message to a playing device currently in a working state; or when there are at least two playing devices in a working state, the server sends the notification message to one of the playing devices according to priority levels of the playing devices.

In step 411, the playing device receives the notification message.

In some embodiments, the notification message is sent by the server after the server finds the playing device associated with the NAS device.

In step 412, the playing device displays the notification message.

The playing device displays the notification message to the user on a display interface. In some embodiments, all the playing devices receiving the notification message display the notification message.

In some embodiments, the notification message is displayed in the form of a popup message, or an unread message, or an unread email. The notification message further shows at least one of a resource name of the multimedia resource, a corresponding instant messaging account, a source download address, a download time, and download details.

In some embodiments, in an enabled state, the playing device immediately displays the notification message to the user on the display interface after receiving the notification message. In a disabled state, the playing device displays the notification message to the user on the display interface after being enabled. If the user chooses to ignore the notification message when the notification message is displayed, the user will be reminded of the notification message regularly in a particular period of time, or the user is prompted in a multimedia resource list interface that the multimedia resource corresponding to the notification message has not been viewed.

Figure 4A:
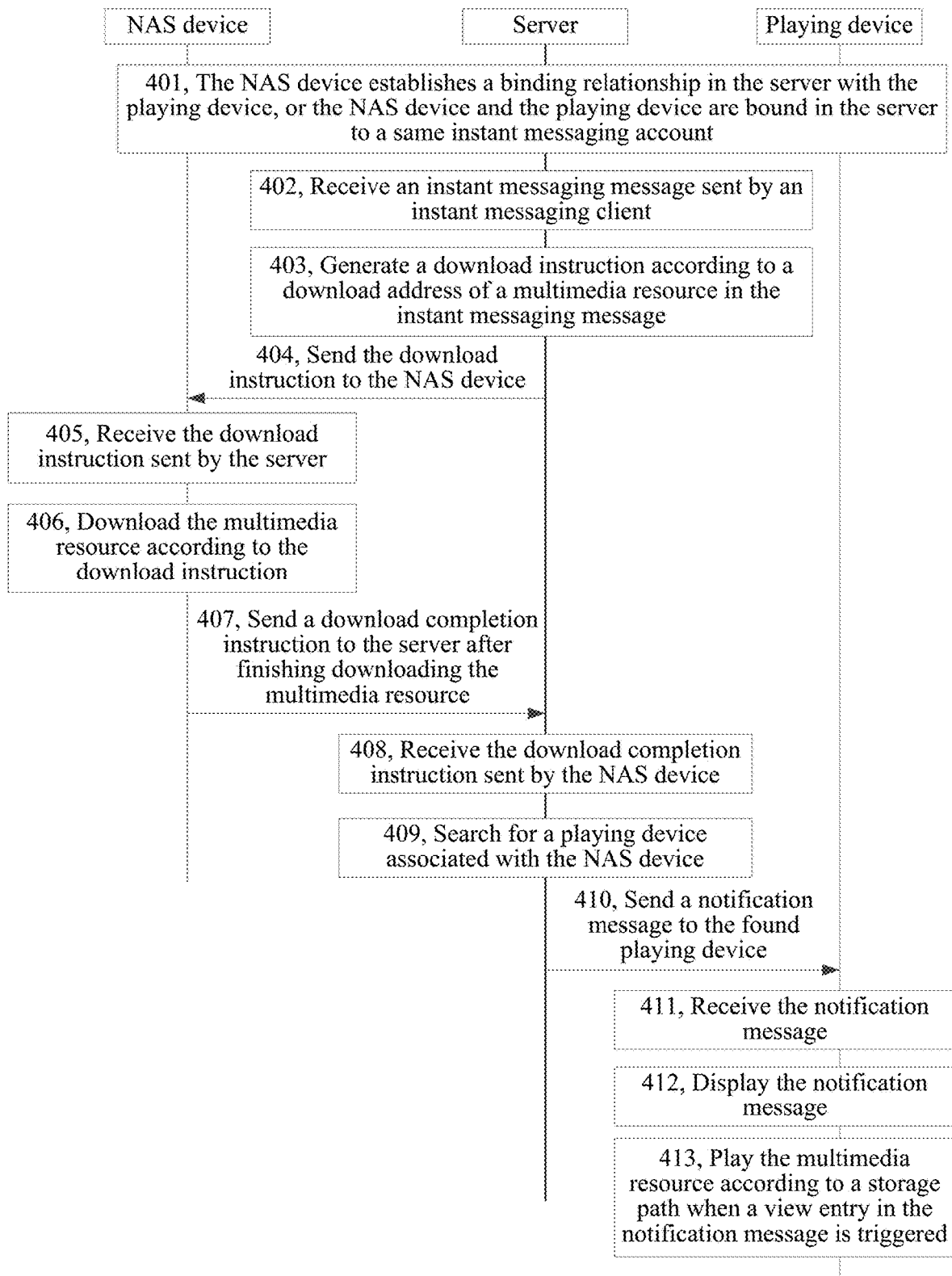
FIG. 4A is a flowchart of a method for playing a multimedia resource according to another exemplary embodiment.
Figure 4B:
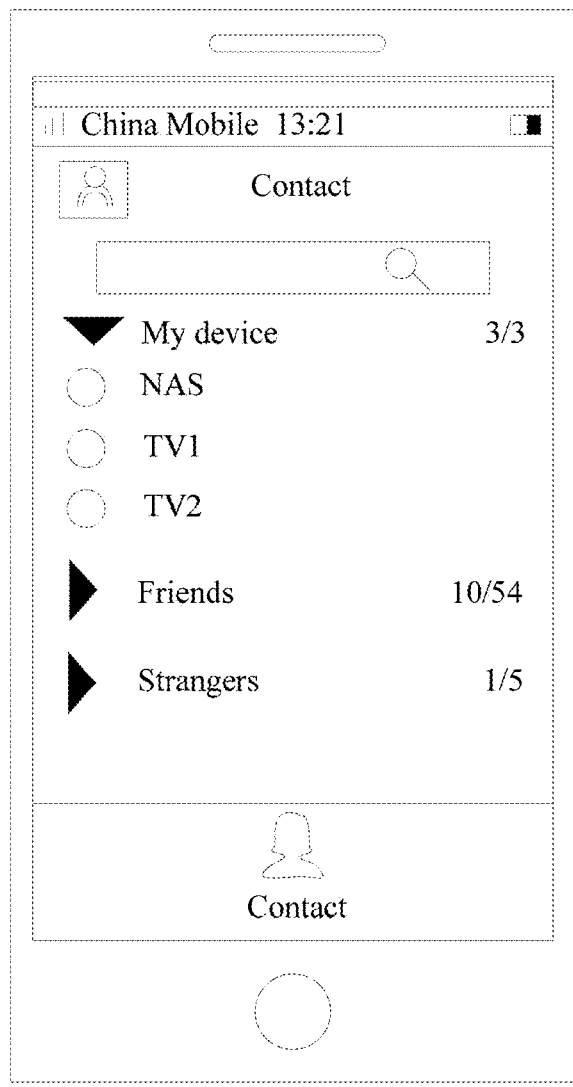
FIG. 4B is an implementation schematic diagram of a method for playing a multimedia resource according to an exemplary embodiment.
Figure 4C:
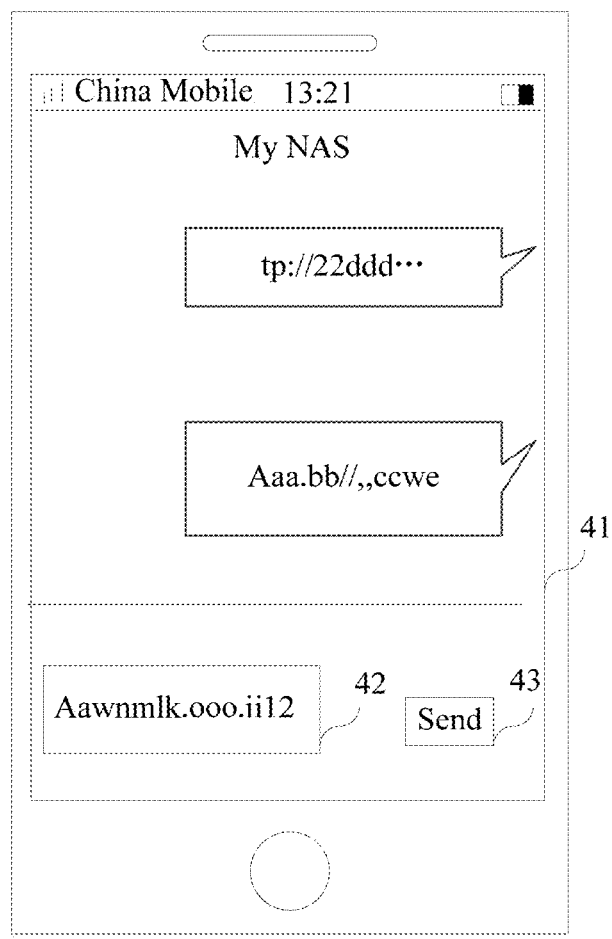
FIG. 4C is an implementation schematic diagram of a method for playing a multimedia resource according to an exemplary embodiment.
Figure 4D:
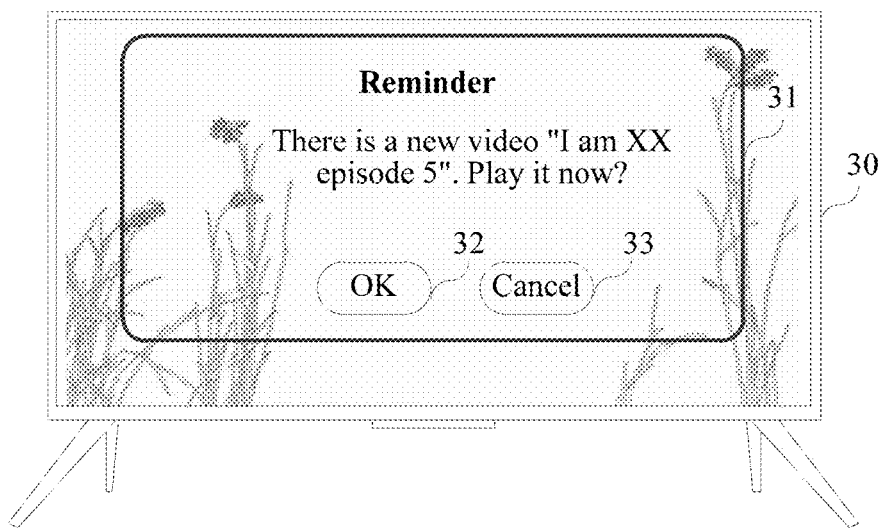
FIG. 4D is a schematic diagram of an interface for displaying a notification message according to an exemplary embodiment.

As shown in FIG. 4D, a playing device 30 is in an enabled state, a notification message 31 is displayed on a display interface, to remind the user to watch a video "I am XX Episode 5" newly downloaded by the NAS device. If the user selects a "confirm" option 32, a view entry in the notification message is triggered. If the user selects a "cancel" option 33, the notification message is ignored.

In some embodiments, the notification message further shows an instant messaging account (or a nickname of remark name corresponding to the instant messaging account). For example, a notification message A is "Your son Mike has downloaded a new video "Legends of xx". Play it now?" For another example, a notification message B is "Your grandson Jim has downloaded a new movie "Unbelievable xx". Play it now?" Son Mike and grandson Jim are remark names of the instant messaging account.

In step 413, the playing device plays the multimedia resource according to the storage path when the view entry in the notification message is triggered.

The playing device searches for the to-be-played multimedia resource in the NAS device according to the storage path of the multimedia resource in the notification message, and plays the multimedia resource after finding the multimedia resource.

In some embodiments, the playing device sends a resource obtaining request to the NAS device, the resource obtaining request carrying the storage path. The NAS device feeds back the corresponding multimedia resource to the playing device according to the storage path after receiving the resource obtaining request.

To sum up, according to the method for playing a multimedia resource provided by this embodiment of the present disclosure, the NAS device obtains a download instruction of the multimedia resource, and downloads the multimedia resource according to the download instruction; the playing device receives and displays a notification message, and plays the multimedia resource according to a storage path when a view entry in the notification message is triggered. Therefore, the method resolves the problem of complex operations when a user shares a multimedia resource, and achieves the effects of automatically notifying a playing device of the user after the multimedia resource is downloaded so that the playing device of the user can play the multimedia resource more conveniently, and simplifying repeated operations of downloading and copying the multimedia resource by the user.

In addition, according to the method for playing a multimedia resource provided by this embodiment of the present disclosure, a download address is further sent to the NAS device by using an instant messaging client, so that the NAS device can be remotely controlled to download the multimedia resource. As such, the user can download the multimedia resource into the NAS device more conveniently and watch the multimedia resource on the playing device more conveniently.

Figure 5:
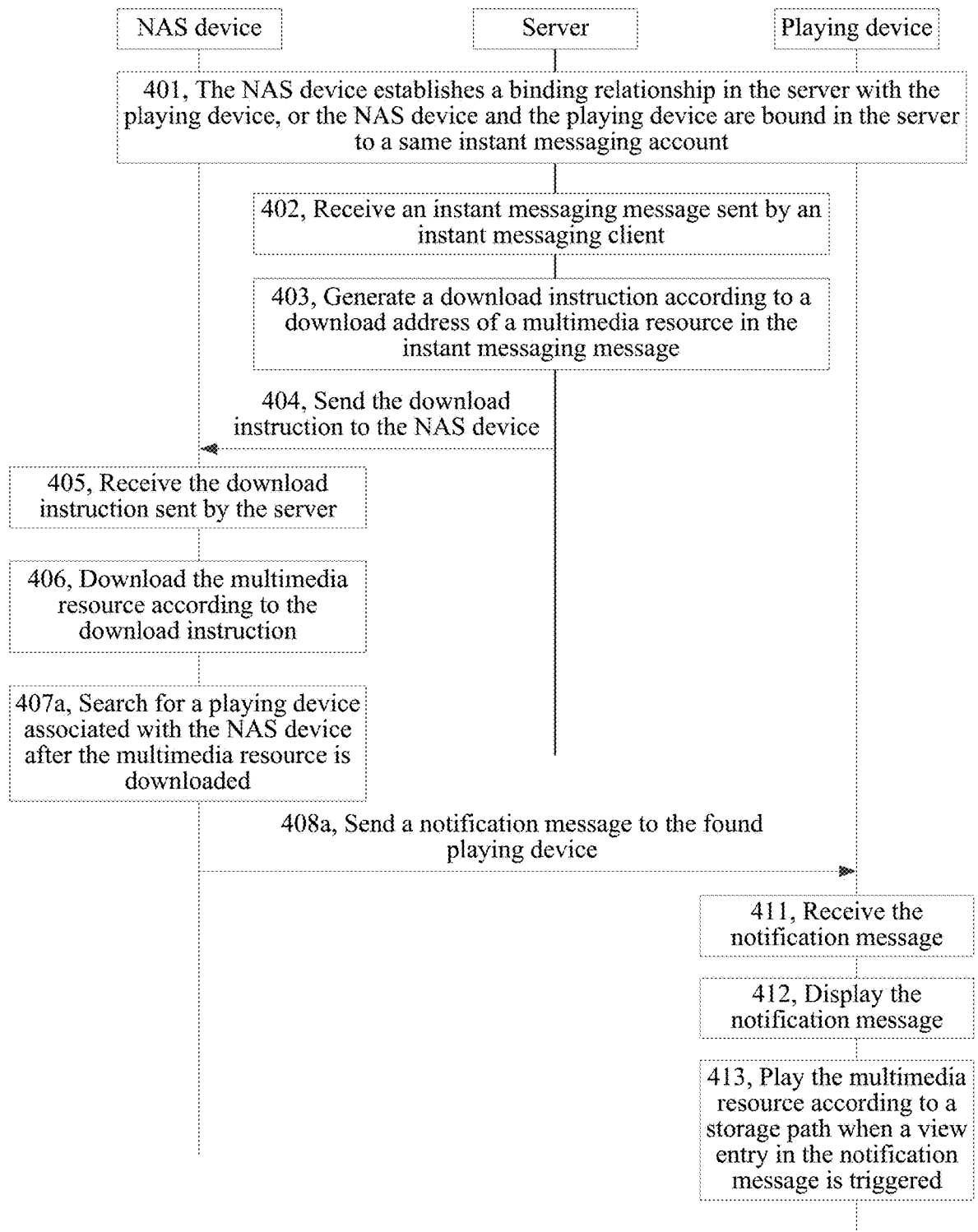
FIG. 5 is a flowchart of a method for playing a multimedia resource according to another exemplary embodiment.

In an optional embodiment based on FIG. 4A, the server may not search for the playing device associated with the NAS device; instead, the NAS device directly searches for the associated playing device, that is, step 407 to step 410 are replaced with step 407a to step 408a, as shown in FIG. 5:

In step 407a, the NAS device searches for a playing device associated with the NAS device after finishing downloading the multimedia resource.

The playing device associated with the NAS device includes at least one of a playing device located in a same local area network with the NAS device, a playing device bound to the NAS device, and a playing device bound to a same instant messaging account as the NAS device.

That is, the playing device associated with the NAS device is a playing device located in a same local area network with the NAS device, or a playing device bound to the NAS device, or a playing device bound to a same instant messaging account as the NAS device, or a playing device bound to the NAS device and a playing device located in a same local area network with the NAS device, or a playing device located in a same local area network with the NAS device and a playing device bound to a same instant messaging account as the NAS device, or a playing device located in a same local area network with the NAS device, a playing device bound to the NAS device, and a playing device bound to a same instant messaging account as the NAS device.

It is assumed that the NAS device finds three playing devices associated with the NAS device, and association relationships are shown in the table below:

| Playing device | Association relationship |
| --- | --- |
| TV | Located in a same local area network as the NAS device |
| Pad_a | Bound to the NAS device |
| Pad_b | Bound to a same instant messaging account as the NAS device |

In step 408a, the NAS device sends a notification message to the found playing device.

The notification message includes a storage path and a view entry of the multimedia resource downloaded by the NAS device according to the download instruction.

The NAS device sends the notification message to all found playing devices; or the NAS device sends the notification message to a playing device currently in a working state; or when there are at least two playing devices in a working state, the NAS device sends the notification message to one of the playing devices according to priority levels of the playing devices. For example, if a total of three playing devices associated with the NAS device are found, the NAS device sends the notification message to the three found playing devices.

Figure 6:
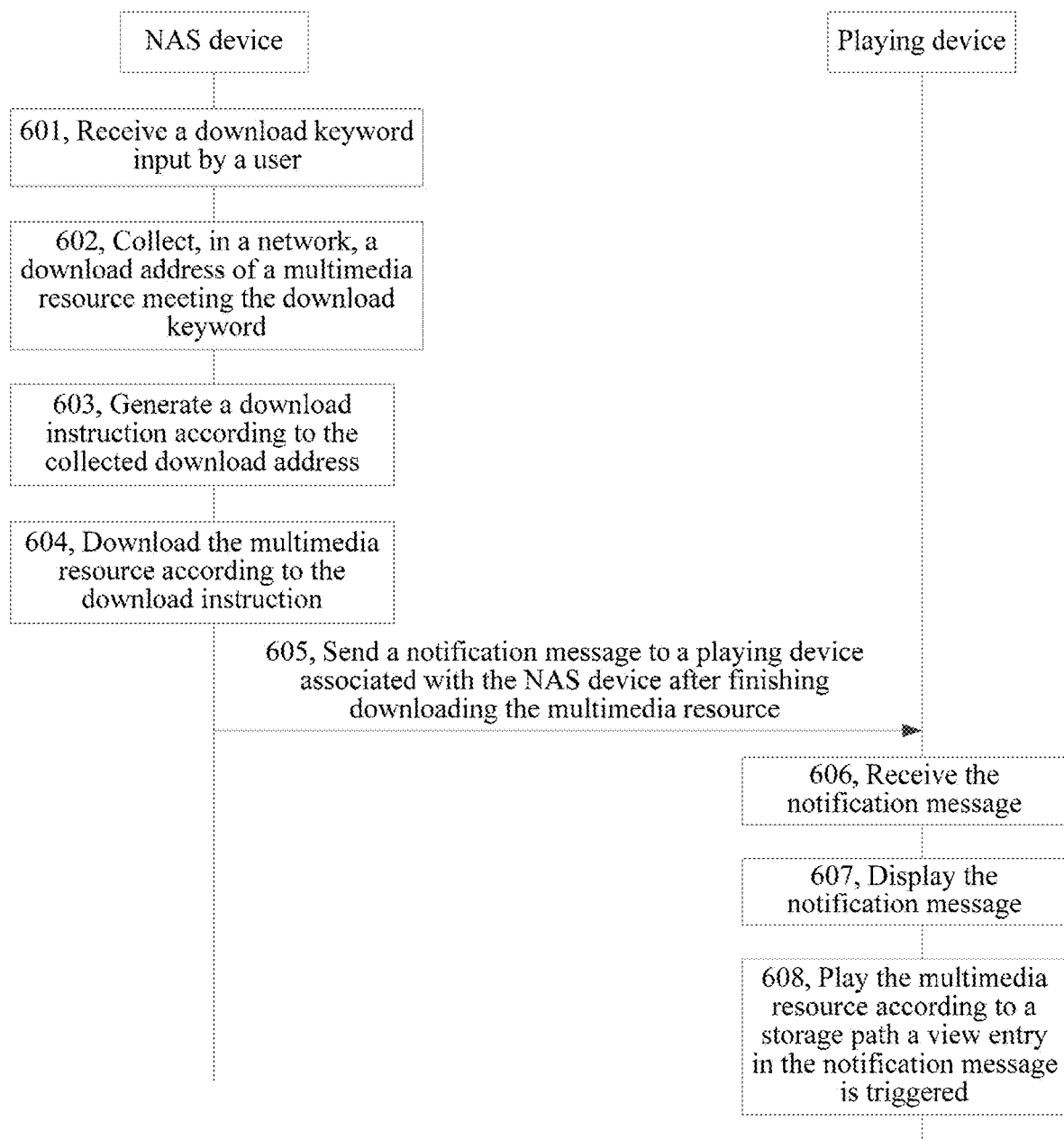
FIG. 6 is a flowchart of a method for playing a multimedia resource according to an exemplary embodiment.

Refer to FIG. 6, which is a flowchart of a method for playing a multimedia resource according to another exemplary embodiment of the present disclosure. The method for playing a multimedia resource being applied to the implementation environment shown in FIG. 2 is used as an example to describe this embodiment. The method for playing a multimedia resource includes the following steps:

In step 601, a NAS device receives a download keyword input by a user.

In step 602, the NAS device collects, in a network, a download address of a multimedia resource meeting the download keyword.

In step 603, the NAS device generates a download instruction according to the collected download address.

In step 604, the NAS device downloads the multimedia resource according to the download instruction.

In step 605, the NAS device sends a notification message to a playing device associated with the NAS device after finishing downloading the multimedia resource, the notification message including: a storage path and a view entry of the multimedia resource in the NAS device.

In some embodiments, the notification message is displayed in the form of a popup message, or an unread message, or an unread email. The notification message further shows at least one of a resource name of the multimedia resource, a corresponding instant messaging account, a source download address, a download time, and download details.

In step 606, the playing device receives the notification message.

In step 607, the playing device displays the notification message.

In step 608, the playing device plays the multimedia resource according to the storage path when the view entry is triggered.

To sum up, according to the method for playing a multimedia resource provided by this embodiment of the present disclosure, the NAS device obtains a download instruction of the multimedia resource, and downloads the multimedia resource according to the download instruction; the playing device receives and displays a notification message, and plays the multimedia resource according to a storage path when a view entry in the notification message is triggered. Therefore, the method resolves the problem of complex operations when a user shares a multimedia resource, and achieves the effects of automatically notifying a playing device of the user after the multimedia resource is downloaded so that the playing device of the user can play the multimedia resource more conveniently, and simplifying repeated operations of downloading and copying the multimedia resource by the user.

Figure 7:
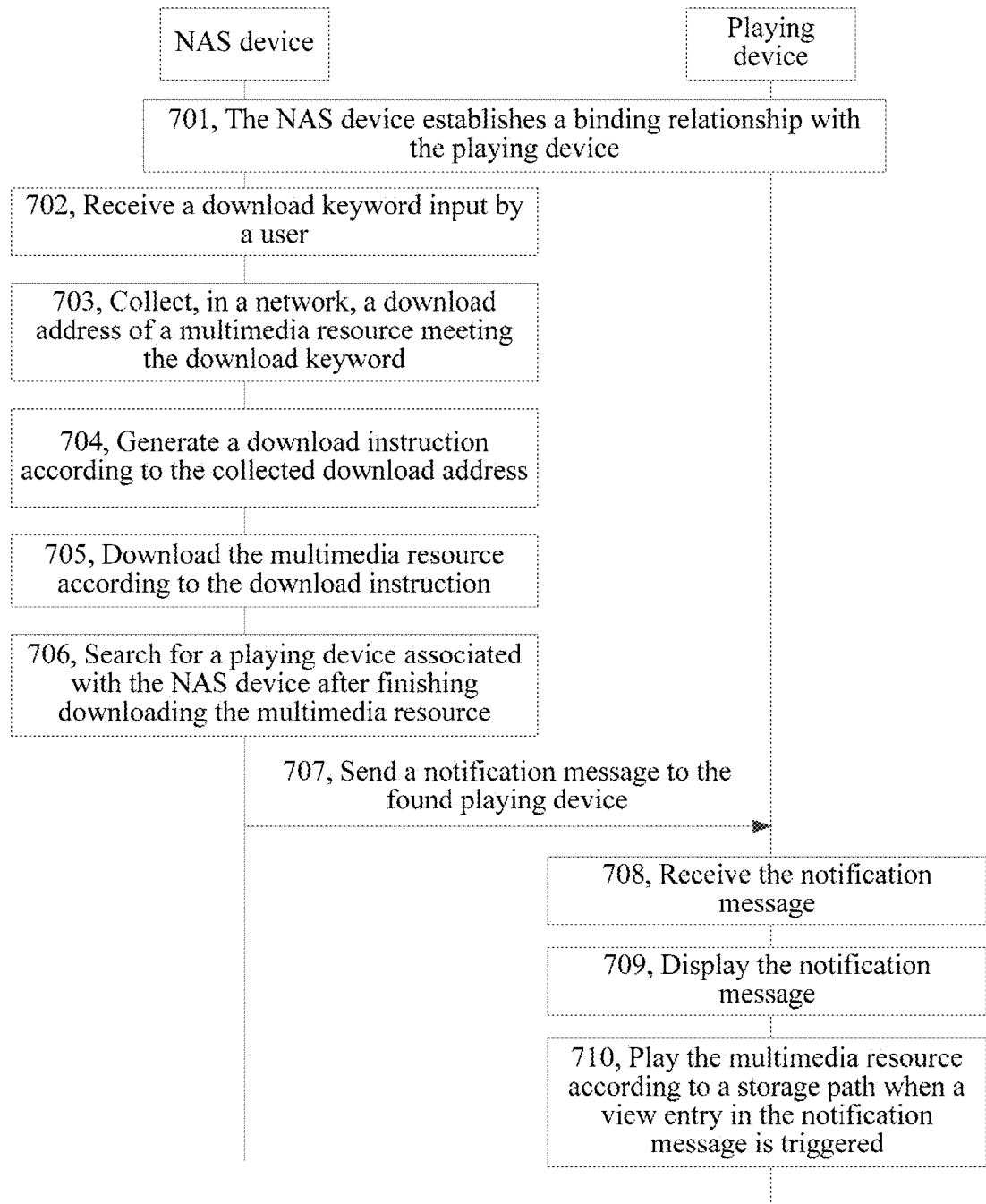
FIG. 7 is a flowchart of a method for playing a multimedia resource according to an exemplary embodiment.

Refer to FIG. 7, which is a flowchart of a method for playing a multimedia resource according to another exemplary embodiment of the present disclosure. The method for playing a multimedia resource being applied to the implementation environment shown in FIG. 2 is used as an example to describe this embodiment. The method for playing a multimedia resource includes the following steps:

In step 701, a NAS device establishes a binding relationship with a playing device.

In some embodiments, the binding relationship is an association relationship or a friend relationship on the instant messaging platform under the same user account.

For example, establishing a binding relationship can be considered as establishing an association relationship between the NAS device and the playing device. In some embodiments, that the NAS device establishes a binding relationship with a playing device can be interpreted as associating an identifier of the NAS device with an identifier of the playing device by using an operating system of the NAS device or a user client corresponding to the NAS device, and storing the association relationship between the identifier of the NAS device and the identifier of the playing device.

In some embodiments, the identifier of the NAS device is marked on the surface of the NAS device in the form of a graphic code, or the identifier of the NAS device is a unique character string. Likewise, the identifier of the playing device is marked on the surface of the playing device in the form of a graphic code, or the identifier of the playing device is a unique character string.

In some embodiments, the user client scans the graphic code corresponding to the identifier to add the playing device, or the identifier character string can be added manually to add the playing device. That is, the user client of the NAS device has a graphic code scanning function, and scans the graphic code of the playing device to obtain the identifier of the playing device and further bind the playing device.

In some embodiments, one NAS device may establish binding relationships with multiple playing devices. One playing device may establish binding relationships with multiple NAS devices.

Correspondingly, the playing device also establishes a binding relationship with the NAS device.

It should be noted that, this embodiment does not limit the sequence of executing this step. This step may also be executed before step 503, or executed before step 504, or executed before step 505, or executed before step 506.

In step 702, the NAS device receives a download keyword input by a user.

The user inputs a download keyword in a control interface in the operating system of the NAS device or on a user client corresponding to the NAS device. The download keyword input by the user is sent to the NAS device by using a backend server of the user client, and the NAS device receives the download keyword.

In step 703, the NAS device collects, in a network, a download address of a multimedia resource meeting the download keyword.

This step can be implemented in two manners:

In the first manner, after the NAS device receives the download keyword, the download address of the multimedia resource meeting the download keyword is collected by using a backend resource server. In some embodiments, the backend resource server collects the download address of the multimedia resource meeting the download keyword according to a preset condition. The preset condition is set by the user in the operating system of the NAS device or the corresponding application in advance. For example, if the preset condition is downloading an interface of a latest episode, when the download keyword input by the user is "I am XX", the NAS device collects, in the network, a download address of the latest episode of "I am XX". If the preset condition is downloading a video with a highest click-through rate, when the download keyword input by the user is "village", the NAS device collects a download address of a video that includes "village" in the subject term and has a highest click-through rate.

In the second manner, after the NAS device receives the download keyword, the operating system of the NAS device collects the multimedia resource meeting the download keyword. In some embodiments, the operating system of the NAS device collects the multimedia resource meeting the download keyword according to a preset condition. The preset condition is set by the user in the operating system of the NAS device or the corresponding application in advance.

In some embodiments, after finishing collecting download addresses of the multimedia resource meeting the download keyword, the NAS device feeds back all or some of the collected download addresses to the user client corresponding to the NAS device. The user selects a download address of the multimedia resource to be used.

In some embodiments, the NAS device collects download addresses of the multimedia resource meeting the download keyword regularly in the network, detects whether the download address is a latest download address, and feeds back the collected latest download address to the user. A time interval for collection may be set by the user in advance. By collecting download addresses of the multimedia resource meeting the download keyword regularly, the user can obtain the latest download address of the multimedia resource meeting the download keyword without frequently inputting the same keyword. For example, if the user is following a TV drama, after the user inputs the title of the TV drama, the NAS device collects download addresses of the TV drama regularly in the network, and upon collecting a latest download address of the TV drama, feeds back the latest download address to the user.

In step 704, the NAS device generates a download instruction according to the collected download address.

The NAS device automatically generates the download instruction according to the collected download address.

In some embodiments, the download instruction includes the collected download address of the multimedia resource.

In step 705, the NAS device downloads the multimedia resource according to the download instruction.

In some embodiments, the NAS device downloads the multimedia resource according to the download address in the download instruction. The multimedia resource downloaded by the NAS device is stored in a storage region of the NAS device.

In step 706, the NAS device searches for a playing device associated with the NAS device after finishing downloading the multimedia resource.

The playing device associated with the NAS device includes at least one of a playing device located in a same local area network with the NAS device, a playing device bound to the NAS device, and a playing device bound to a same instant messaging account as the NAS device.

That is, the playing device associated with the NAS device is a playing device located in a same local area network with the NAS device, or a playing device bound to the NAS device, or a playing device bound to a same instant messaging account as the NAS device, or a playing device bound to the NAS device and a playing device located in a same local area network with the NAS device, or a playing device located in a same local area network with the NAS device and a playing device bound to a same instant messaging account as the NAS device, or a playing device located in a same local area network with the NAS device, a playing device bound to the NAS device, and a playing device bound to a same instant messaging account as the NAS device.

It is assumed that the NAS device finds two playing devices associated with the NAS device, and association relationships are shown in the table below:

| Playing device | Association relationship |
| --- | --- |
| TV | Located in a same local area network with the NAS device |
| Pad_a | Bound to the NAS device |

In step 707, the NAS device sends a notification message to the found playing device.

The notification message includes a storage path and a view entry of the multimedia resource downloaded by the NAS device according to the download instruction.

The NAS device sends the notification message to all found playing devices; or the NAS device sends the notification message to a playing device currently in a working state; or when there are at least two playing devices in a working state, the NAS device sends the notification message to one of the playing devices according to priority levels of the playing devices. For example, if a total of three playing devices associated with the NAS device are found, the NAS device sends the notification message to the three found playing devices.

In step 708, the playing device receives the notification message.

In some embodiments, the notification message is sent by the NAS device associated with the playing device after the NAS device finishes downloading the multimedia resource according to the download instruction.

In step 709, the playing device displays the notification message.

The playing device displays the notification message to the user on a display interface. In some embodiments, all playing devices receiving the notification message display the notification message.

In some embodiments, in an enabled state, the playing device immediately displays the notification message to the user on the display interface after receiving the notification message. In a disabled state, the playing device displays the notification message to the user on the display interface after being enabled. If the user chooses to ignore the notification message when the notification message is displayed, the user will be reminded of the notification message regularly in a particular period of time, or the user is prompted in a multimedia resource list interface that the multimedia resource corresponding to the notification message has not been viewed.

This step has been described in detail in the foregoing embodiment, and is not described again herein.

In step 710, the playing device plays the multimedia resource according to the storage path when the view entry in the notification message is triggered.

The playing device searches for the to-be-played multimedia resource according to the storage path of the multimedia resource in the notification message, and plays the multimedia resource after finds the multimedia resource.

To sum up, according to the method for playing a multimedia resource provided by this embodiment of the present disclosure, the NAS device obtains a download instruction of the multimedia resource, and downloads the multimedia resource according to the download instruction; the playing device receives and displays a notification message, and plays the multimedia resource according to a storage path when a view entry in the notification message is triggered. Therefore, the method resolves the problem of complex operations when a user shares a multimedia resource, and achieves the effects of automatically notifying a playing device of the user after the multimedia resource is downloaded so that the playing device of the user can play the multimedia resource more conveniently, and simplifying repeated operations of downloading and copying the multimedia resource by the user.

In addition, according to the method for playing a multimedia resource provided by this embodiment of the present disclosure, a download keyword input by the user is further received; after a download address of the multimedia resource meeting the download keyword is collected in the network, a download instruction is generated automatically and the multimedia resource is downloaded, so that the user can download and share the multimedia resource by inputting the download keyword, thereby simplifying operation steps and improving user experience.

Figure 8:
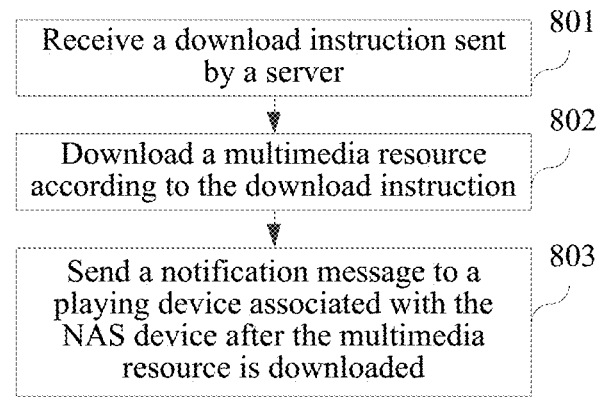
FIG. 8 is a flowchart of a method for playing a multimedia resource according to an exemplary embodiment.

Refer to FIG. 8, which is a flowchart of a method for playing a multimedia resource according to an exemplary embodiment of the present disclosure. The method for playing a multimedia resource being applied to the NAS device shown in FIG. 1 or FIG. 2 is used as an example to describe this embodiment. The method for playing a multimedia resource includes the following steps:

In step 801, a download instruction sent by a server is received.

In step 802, a multimedia resource is downloaded according to the download instruction.

In step 803, a notification message is sent to a playing device associated with the NAS device after the multimedia resource is downloaded.

The notification message includes a storage path and a view entry of the multimedia resource in the NAS device.

The playing device is configured to play the multimedia resource according to the storage path when the view entry is triggered.

In some embodiments, the NAS device may independently send the notification message to the playing device associated with the NAS device, or the NAS device sends the notification message to the playing device associated with the NAS device by using a server.

To sum up, according to the method for playing a multimedia resource provided by this embodiment of the present disclosure, the NAS device obtains a download instruction of the multimedia resource, and downloads the multimedia resource according to the download instruction; the playing device receives and displays a notification message, and plays the multimedia resource according to a storage path when a view entry in the notification message is triggered. Therefore, the method resolves the problem of complex operations when a user shares a multimedia resource between different playing devices, and achieves the effects of automatically sending the downloaded multimedia resource to different playing devices without requiring the user to repeatedly download and copy the multimedia resource, and simplifying operations.

Figure 9:
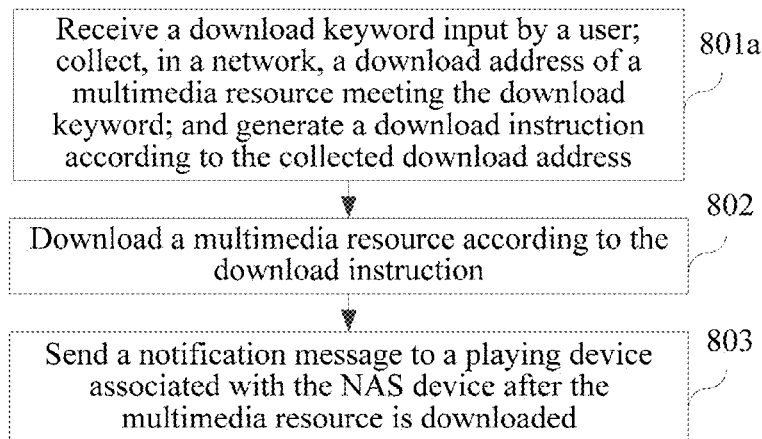
FIG. 9 is a flowchart of a method for playing a multimedia resource according to an exemplary embodiment.

In an optional embodiment based on the embodiment shown in FIG. 8, the NAS device may not obtain the download instruction by using the server, but generates the download instruction on its own, that is, step 801 is replaced with step 801a, as shown in FIG. 9:

In step 801a, a download keyword input by a user is received, a download address of a multimedia resource meeting the download keyword is collected in a network, and a download instruction is generated according to the collected download address.

According to the method for playing a multimedia resource provided by this embodiment of the present disclosure, a download keyword input by the user is further received; after a download address of the multimedia resource meeting the download keyword is collected in the network, a download instruction is generated automatically and the multimedia resource is downloaded, so that the user can download and share the multimedia resource by inputting the download keyword, thereby simplifying operation steps and improving user experience.

Figure 10:
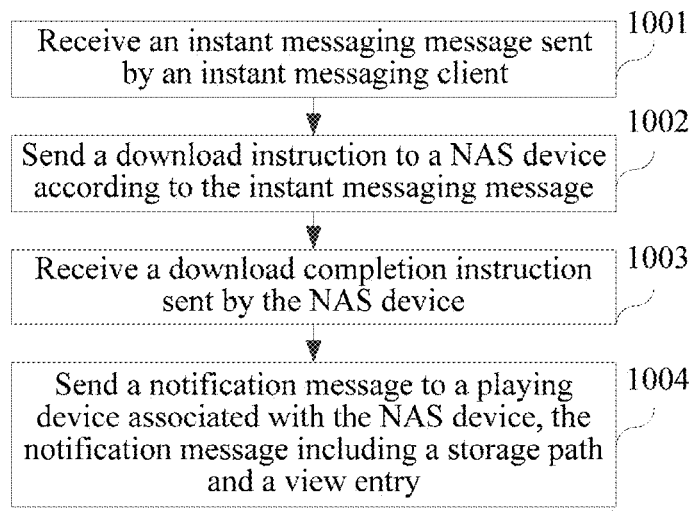
FIG. 10 is a flowchart of a method for playing a multimedia resource according to an exemplary embodiment.

Refer to FIG. 10, which is a flowchart of a method for playing a multimedia resource according to an exemplary embodiment of the present disclosure. The method for playing a multimedia resource being applied to the server shown in FIG. 1 is used as an example to describe this embodiment. The method for playing a multimedia resource includes the following steps:

In step 1001, an instant messaging message sent by an instant messaging client is received.

The instant messaging message includes a download address of a multimedia resource, and the instant messaging client has a binding relationship with a NAS device.

In step 1002, a download instruction is sent to a NAS device according to the instant messaging message.

In step 1003, a download completion instruction sent by the NAS device is received.

The download completion instruction includes a storage path of the multimedia resource in the NAS device.

In step 1004, a notification message is sent to a playing device associated with the NAS device, the notification message including a storage path and a view entry.

The playing device is configured to play the multimedia resource according to the storage path when the view entry is triggered.

To sum up, according to the method for playing a multimedia resource provided by this embodiment of the present disclosure, the NAS device obtains a download instruction of the multimedia resource, and downloads the multimedia resource according to the download instruction; the playing device receives and displays a notification message, and plays the multimedia resource according to a storage path when a view entry in the notification message is triggered. Therefore, the method resolves the problem of complex operations when a user shares a multimedia resource between different playing devices, and achieves the effects of automatically sending the downloaded multimedia resource to different playing devices without requiring the user to repeatedly download and copy the multimedia resource, and simplifying operations.

Based on the above, in some embodiments, a method of playing multimedia resource is performed at a server having one or more processors and memory, the server being configured to communicate with a plurality of instant messaging client devices (e.g., running an instant messaging client-side of a social network application that is associated a user account of a social network corresponding to the social network application) and to support instant messaging (e.g., SMS or instant messages of other formats) among the plurality of instant messaging client devices. The server receives a first instant messaging message sent by a first instant messaging client corresponding to a first user account, the first instant messaging message being addressed to a second instant messaging client corresponding to a second user account that is distinct from the first user account, and the first instant messaging message including a download address of a multimedia resource. In response to receiving the first instant messaging message from the first instant messaging client: the server forwards the first instant messaging message to a second instant messaging client device corresponding to the second user account; and in accordance with a determination that the first instant messaging message includes a download address of a multimedia resource, and that the second user account is bound to a network attached storage (NAS) device: the server generates a download instruction according to the download address of the multimedia resource in accordance with a command protocol of the NAS device bound to the second user account; and the server sends the download instruction to the NAS device, wherein the NAS device downloads the multimedia resource in accordance with the download instruction.

In some embodiments, sending the download instruction to the NAS device includes: sending the download instruction to the second instant messaging client device over the Internet with a request (e.g., formatted according to the command protocol of the second instant messaging client device) for the second instant messaging client device to forward the download instruction to the NAS device via a local area network linking the second instant messaging client device and the NAS device, wherein the second instant messaging client device sends the download instruction to the NAS device via the local area network according to the request without requiring further instruction from a user of the second instant messaging client device.

In some embodiments, in response to receiving the first instant messaging message: in accordance with a determination that the first instant messaging message includes a download address of a multimedia resource, and that the second user account is bound to a network attached storage (NAS) device: the server generates a playback instruction in accordance with a command protocol of a playing device bound to the second user account; and the server sends the playback instruction to the NAS device with a request (e.g., formatted according to the command protocol of the NAS device) (e.g., the playback instruction and the request are send in a notification message to the NAS device) to forward the playback instruction to the playing device that is bound to the second user account when download of the multimedia resource is completed at the NAS device, wherein the NAS device forwards the playback instruction to the playing device after the download of the multimedia resource is completed at the NAS device without requiring further instruction from a user of the second instant messaging client device or a user of the NAS device.

In some embodiments, the playback instruction includes one or more predefined playback times (e.g., the preferred playback time that is preconfigured by the user of the second user account or the user of the first user account), and wherein the playing device generates a prompt requesting user confirmation of the playback of the multimedia resource in accordance with the one or more predefined playback times.

In some embodiments, the playback instruction includes reading access permission to the playing device to access the multimedia resource at the NAS device.

In some embodiments, after sending the download instruction to the NAS device, the server receives a download completion message from the NAS device regarding completion of download of the multimedia resource at the NAS device (e.g., including a storage file path of the multimedia resource at the NAS device). In response to receiving the download completion message from the NAS device, and in accordance with a determination that the second user account is bound to a playing device that is distinct from the NAS device and the second instant messaging client device: the server generates a playback instruction (e.g., including the access location of the multimedia resource at the NAS device) in accordance with a command protocol of the playing device bound to the second user account; and the server sends the playback instruction to the playing device (e.g., directly over the Internet, or through the local area network of the second instant messaging client device), wherein the playing device plays back the multimedia resource in accordance with the playback instruction.

In some embodiments, after sending the playback instruction to the playing device, the server receives a playback acceptance message from the playing device regarding playback of the multimedia resource at the playing device. In response to receiving the playback acceptance message from the playing device: the server generates a second instant messaging message addressed to the first user account regarding playback of the multimedia resource; and the server sends the second instant messaging message to the first instant messaging client device corresponding to the first user account, wherein the first instant messaging client device displays the second instant messaging message (e.g., as a message from the playing device or as a message from the second user account) in a conversation interface for an instant messaging conversation between the first user account and the second user account (e.g., as a reply message to the message including the download address of the multimedia resource).

Other details of the embodiments are described in other parts of the present disclosure and are not repeated herein in the interest of brevity. These features can be combined with the above embodiments in accordance with various embodiments.

Figure 11:
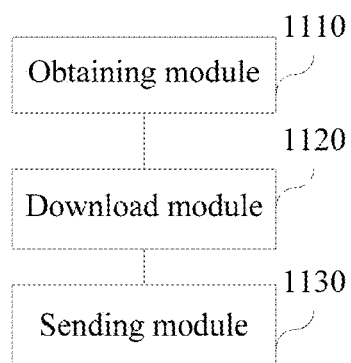
FIG. 11 is a block diagram of a multimedia resource playing apparatus according to an exemplary embodiment.

Refer to FIG. 11, which is a structural block diagram of a multimedia playing apparatus according to an embodiment of the present disclosure. The multimedia playing apparatus can be implemented, by means of software, hardware, or a combination thereof, as all or a part of the foregoing NAS device capable of providing a multimedia playing method. The apparatus includes:

an obtaining module 1110, configured to receive a download instruction sent by a server; or receive a download keyword input by a user, collect, in a network, a download address of a multimedia resource meeting the download keyword, and generate a download instruction according to the collected download address;

a download module 1120, configured to download the multimedia resource according to the download instruction; and a sending module 1130, configured to send a notification message to a playing device associated with a NAS device after the multimedia resource is downloaded, the notification message including a storage path and a view entry of the multimedia resource in the NAS device, and the playing device being configured to play the multimedia resource according to the storage path when the view entry is triggered.

To sum up, according to the multimedia resource playing apparatus provided by this embodiment of the present disclosure, a download instruction of a multimedia resource is obtained, and the multimedia resource is downloaded according to the download instruction. Therefore, the apparatus resolves the problem of complex operations when a user shares a multimedia resource, and achieves the effects of automatically notifying a playing device of the user after the multimedia resource is downloaded so that the playing device of the user can play the multimedia resource more conveniently, and simplifying repeated operations of downloading and copying the multimedia resource by the user.

Figure 12:
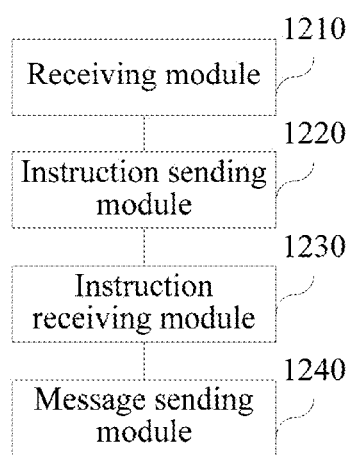
FIG. 12 is a block diagram of a multimedia resource playing apparatus according to an exemplary embodiment.

Refer to FIG. 12, which is a structural block diagram of a multimedia playing apparatus according to another embodiment of the present disclosure. The multimedia playing apparatus can be implemented, by means of software, hardware, or a combination thereof, as all or a part of the foregoing server capable of providing a multimedia playing method. The apparatus includes:

a receiving module 1210, configured to receive an instant messaging message sent by an instant messaging client, the instant messaging message including a download address of a multimedia resource, and the instant messaging client having a binding relationship with a NAS device;

an instruction sending module 1220, configured to send a download instruction to the NAS device according to the instant messaging message;

an instruction receiving module 1230, configured to receive a download completion instruction sent by the NAS device, the download completion instruction including a storage path of the multimedia resource in the NAS device; and a message sending module 1240, configured to send a notification message to a playing device associated with the NAS device, the notification message including the storage path and a view entry, the playing device being configured to play the multimedia resource according to the storage path when the view entry is triggered.

To sum up, according to the multimedia resource playing apparatus provided by this embodiment of the present disclosure, an instant messaging message sent by an instant messaging client is received, a download completion instruction sent by a NAS device is received, and a notification message is sent to a playing device associated with the NAS device. Therefore, the apparatus resolves the problem of complex operations when a user shares a multimedia resource, and achieves the effects of automatically notifying a playing device of the user after the multimedia resource is downloaded so that the playing device of the user can play the multimedia resource more conveniently, and simplifying repeated operations of downloading and copying the multimedia resource by the user.

It should be noted that, when the multimedia playing apparatus provided in the foregoing embodiment performs the foregoing multimedia playing method, division of the foregoing functional modules is only described for exemplary purposes. In an actual application, the foregoing functions may be allocated to be accomplished by different functional modules according to requirements, that is, the internal structure of the device is divided into different functional modules, to accomplish all or some of the foregoing functions. In addition, the multimedia playing apparatus provided in the foregoing embodiment belongs to the same concept as the embodiment of the multimedia playing method. For a specific implementation process of the apparatus, refer to the method embodiment, and details are not described herein again.

Figure 13:
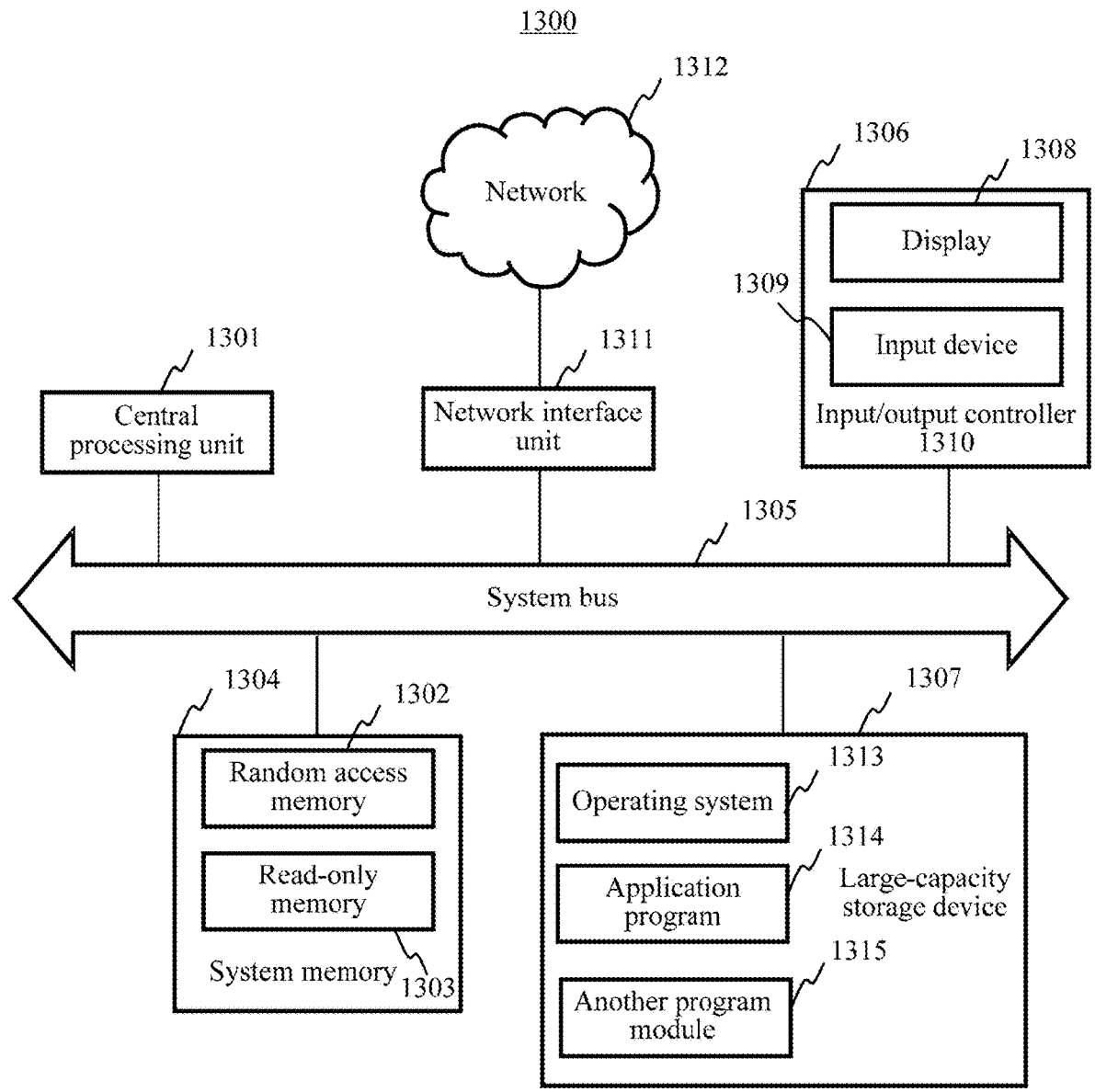
FIG. 13 is a block diagram of a server according to an exemplary embodiment.

Refer to FIG. 13, which is a schematic structural diagram of a server according to an exemplary embodiment. The server is configured to implement the server-side method for playing a multimedia resource provided in the foregoing embodiment. Specifically:

The server 1300 includes a central processing unit (CPU) 1301, a system memory 1304 including a random access memory (RAM) 1302 and a read-only memory (ROM) 1303, and a system bus 1305 connecting the system memory 1304 and the CPU 1301. The server 1300 further includes a basic input/output system (I/O system) 1306 assisting in transmitting information between devices in a computer, and a large-capacity storage device 1307 configured to store an operating system 1313, an application program 1314 and another program module 1315.

The basic I/O system 1306 includes a display 1308 configured to display information and an input device 1309, such as a mouse or a keyboard, configured to input information for a user. The display 1308 and the input device 1309 are both connected to the CPU 1301 by using an input and output controller 1310 connected to the system bus 1305. The basic I/O system 1306 may further include the input and output controller 1310 to receive and process inputs from multiple other devices such as a keyboard, a mouse, and an electronic stylus. Similarly, the input and output controller 1310 further provides an output to a display screen, a printer or another type of output device.

The large-capacity storage device 1307 is connected to the CPU 1301 by using a large-capacity storage controller (not shown) connected to the system bus 1305. The large-capacity storage device 1307 and its associated computer readable medium provide non-volatile storage for the server 1300. That is to say, the large-capacity storage device 1307 may include the computer readable medium (not shown) such as a hard disk or a CD-ROM driver.

Without loss of generality, the computer readable medium may include a computer storage medium and a communications medium. The computer storage medium includes volatile and non-volatile media, and removable and non-removable media implemented by using any method or technology used for storing information such as a computer readable instruction, a data structure, a program module or other data. The computer storage medium includes a RAM, a ROM, an erasable programmable read-only memory (EPROM), an electrically erasable programmable read-only memory (EEPROM), a flash memory or other solid-state storage technologies; a CD-ROM, a DVD or other optical storages; and a cassette, a magnetic tape, a disk storage or other magnetic storage devices. Certainly, a person skilled in art can know that the computer storage medium is not limited to the foregoing several types. The system memory 1304 and the large-capacity storage device 1307 may be collectively referred to as a memory.

According to the embodiments of the present disclosure, the server 1300 may further be connected, by using a network such as the Internet, to a remote computer on the network and run. That is, the server 1300 may be connected to a network 1312 by using a network interface unit 1311 connected to the system bus 1305, or may be to connected to another type of network or remote computer system (not shown) by using the network interface unit 1311.

The memory 1304 further includes one or more programs. The one or more programs are stored in the memory 1304 and configured to be executed by one or more processors. The one or more programs include instructions for performing the server-side method for playing a multimedia resource provided in the foregoing embodiment.

Figure 14:
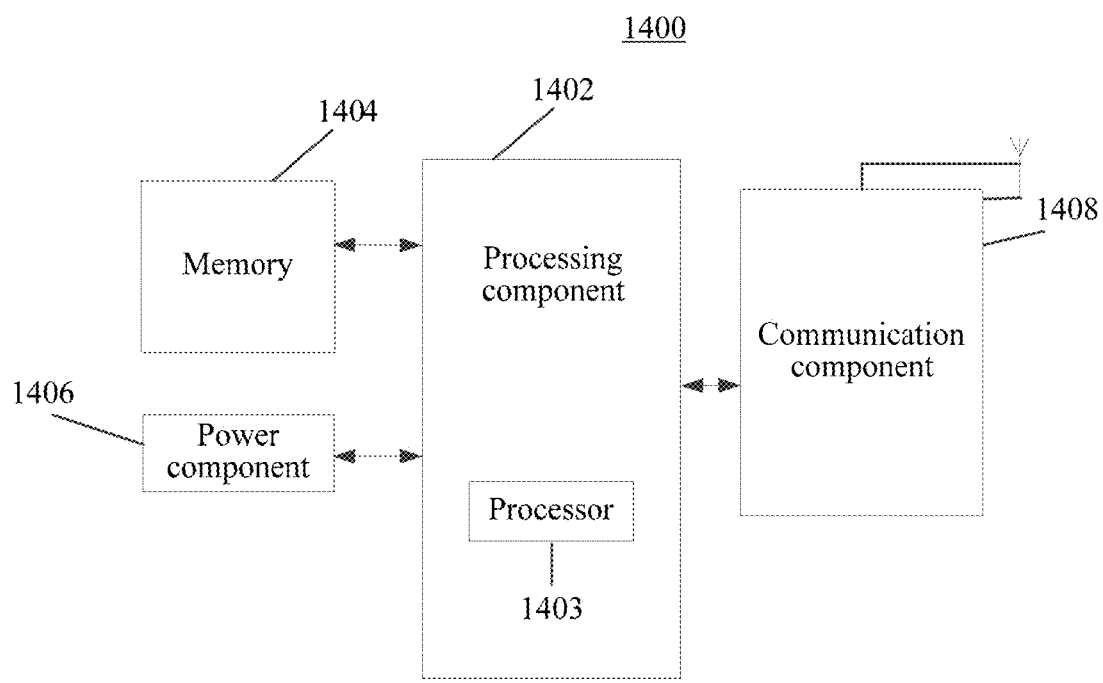
FIG. 14 is a block diagram of a NAS device according to an exemplary embodiment.

Refer to FIG. 14, which is a block diagram of a NAS device according to an exemplary embodiment. A smart home device 1400 may include one or more of the following components: a processing component 1402, a memory 1404, a power component 1406, and a communication component 1408.

The processing component 1402 usually controls overall operations of the NAS device 1400. The processing component 1402 may include one or more processors 1403 to execute instructions, so as to accomplish all or some of the steps executed by the NAS device 1400 in the foregoing embodiment. In addition, the processing component 1402 may include one or more modules, so that the processing component 1402 can interact with other components.

The memory 1404 is configured to store various types of data to support operations of the NAS device 1400. Examples of the data include instructions, data, and the like of any application or method to be operated on the NAS device 1400. The data includes a first device key and/or a first session key. The memory 1404 may be implemented by any type of volatile or non-volatile storage devices or a combination thereof, for example, a static random access memory (SRAM), an EEPROM, an EPROM, a PROM, a ROM, a magnetic memory, a flash memory, a magnetic disk or an optical disc. The memory 1404 further stores one or more modules. The one or more modules are configured to be executed by the one or more processors 1420, so as to accomplish all or some of the steps executed by the NAS device 1400 in the foregoing embodiment.

The power component 1406 provides power to various components of the NAS device 1400. The power component 1406 may include a power management system, one or more power supplies, and other components associated with power generation, management, and distribution of the NAS device 1400.

The communication component 1408 is configured to facilitate wired or wireless communication between the NAS device 1400 and a server or controller. The NAS device 1400 may be a wireless network based on a communications standard, such as WiFi, 2G or 3G, or a combination thereof. In an exemplary embodiment, the communication component 1408 receives a broadcast signal or broadcast-related information from an external broadcast management system via a broadcast channel. In an exemplary embodiment, the communication component 1408 further includes a near field communication (NFC) module, to facilitate short range communication. For example, the NFC module may be implemented based on a radio frequency identification (RFID) technology, an Infrared data association (IrDA) technology, an ultra-wideband (UWB) technology, a Bluetooth (BT) technology, and other technologies.

In some embodiments, the NAS device 1400 may be implemented by one or more application-specific integrated circuit (ASIC), a digital signal processor (DSP), a digital signal processing device (DSPD), a programmable logic device (PLD), a field programmable gate array (FPGA), a controller, a microcontroller, a microprocessor, or other electronic elements, and is configured to implement all or some of the steps executed by the NAS device 1400 in the foregoing embodiment.

In some embodiments, a non-transitory computer readable storage medium including an instruction is further provided, for example, a memory 1404 including an instruction. The instruction may be executed by the processor 1403 of the NAS device 1400 to accomplish the foregoing method. For example, the non-temporary computer readable storage medium may be a ROM, a RAM, a CD-ROM, a magnetic tape, a floppy disk, and an optical data storage device.

In an exemplary embodiment, a non-transitory computer readable storage medium including an instruction is further provided, for example, a memory including an instruction. The instruction may be executed by the processor of the server to accomplish the server-side steps in the foregoing method embodiment. For example, the non-transitory computer readable storage medium may be a ROM, a RAM, a CD-ROM, a magnetic tape, a floppy disk and an optical data storage device.

In an exemplary embodiment, a non-transitory computer readable storage medium including an instruction is further provided, for example, a memory including an instruction. The instruction may be executed by the processor of the NAS device to accomplish the NAS device-side steps in the foregoing method embodiment. For example, the non-tran-

What is claimed is:

1. A method, comprising:
at a server having one or more processors and memory, the server being configured to communicate with a plurality of instant messaging client devices and to support instant messaging among the plurality of instant messaging client devices:
receiving a first instant messaging message sent by a first instant messaging client corresponding to a first user account at a first instant messaging client device, the first instant messaging message being addressed to a second instant messaging client corresponding to a second user account at a second instant messaging client device that is distinct from the first user account, and the first instant messaging message including a download address of a multimedia resource provided by the first user account;
in response to receiving the first instant messaging message from the first instant messaging client:
forwarding the first instant messaging message to the second instant messaging client device corresponding to the second user account;
in accordance with a determination that the first instant messaging message includes a download address of a multimedia resource, and that the second user account is bound to a network attached storage (NAS) device, wherein the second user account is bound to the NAS device when (i) the NAS is registered in the server as an associated device under the second user account or (ii) the second instant messaging client device has read and/or write privileges on the NAS device:
generating a download instruction according to the download address of the multimedia resource in accordance with a command protocol of the NAS device bound to the second user account;
sending the download instruction to the NAS device to begin download of the multimedia resource automatically in accordance with the download instruction; and
causing a display of a popup notification generated by the NAS device on the second instant messaging client device, wherein the popup notification comprises a view entry that retrieves the multimedia resource from the NAS device and plays the multimedia resource after the view entry is triggered, wherein the multimedia resource from the NAS device is played independently of the first user account.

2. The method of claim 1, wherein sending the download instruction to the NAS device includes:
sending the download instruction to the second instant messaging client device over the Internet with a request for the second instant messaging client device to forward the download instruction to the NAS device via a local area network linking the second instant messaging client device and the NAS device, wherein the second instant messaging client device sends the download instruction to the NAS device via the local area network according to the request without requiring further instruction from a user of the second instant messaging client device.

3. The method of claim 1, including:
in response to receiving the first instant messaging message:
in accordance with a determination that the first instant messaging message includes a download address of a multimedia resource, and that the second user account is bound to a network attached storage (NAS) device:
generating a playback instruction in accordance with a command protocol of a playing device bound to the second user account; and
sending the playback instruction to the NAS device with a request to forward the playback instruction to the playing device that is bound to the second user account when download of the multimedia resource is completed at the NAS device, wherein the NAS device forwards the playback instruction to the playing device after the download of the multimedia resource is completed at the NAS device without requiring further instruction from a user of the second instant messaging client device or a user of the NAS device.

4. The method of claim 3, wherein the playback instruction includes one or more predefined playback times, and wherein the playing device generates a prompt requesting user confirmation of the playback of the multimedia resource in accordance with the one or more predefined playback times.

5. The method of claim 4, wherein the playback instruction includes reading access permission to the playing device to access the multimedia resource at the NAS device.

6. The method of claim 1, including:
after sending the download instruction to the NAS device, receiving a download completion message from the NAS device regarding completion of download of the multimedia resource at the NAS device; and
in response to receiving the download completion message from the NAS device, and in accordance with a determination that the second user account is bound to a playing device that is distinct from the NAS device and the second instant messaging client device:
generating a playback instruction in accordance with a command protocol of the playing device bound to the second user account; and
sending the playback instruction to the playing device, wherein the playing device plays back the multimedia resource in accordance with the playback instruction.

7. The method of claim 6, including:
after sending the playback instruction to the playing device, receiving a playback acceptance message from the playing device regarding playback of the multimedia resource at the playing device; and in response to receiving the playback acceptance message from the playing device:
generating a second instant messaging message addressed to the first user account regarding playback of the multimedia resource; and
sending the second instant messaging message to the first instant messaging client device corresponding to the first user account, wherein the first instant messaging client device displays the second instant messaging message in a conversation interface for an instant messaging conversation between the first user account and the second user account.

8. A server, comprising:
one or more processors;
memory; and
a plurality of instructions stored in the memory that, when executed by the one or more processors, cause the one or more processors to perform operations, wherein the server is configured to communicate with a plurality of instant messaging client devices and to support instant messaging among the plurality of instant messaging client devices:
receiving a first instant messaging message sent by a first instant messaging client corresponding to a first user account at a first instant messaging client device, the first instant messaging message being addressed to a second instant messaging client corresponding to a second user account at a second instant messaging client device that is distinct from the first user account, and the first instant messaging message including a download address of a multimedia resource provided by the first user account;
in response to receiving the first instant messaging message from the first instant messaging client:
forwarding the first instant messaging message to a second instant messaging client device corresponding to the second user account;
in accordance with a determination that the first instant messaging message includes a download address of a multimedia resource, and that the second user account is bound to a network attached storage (NAS) device, wherein the second user account is bound to the NAS device when (i) the NAS is registered in the server as an associated device under the second user account or (ii) the second instant messaging client device has read and/or write privileges on the NAS device:
generating a download instruction according to the download address of the multimedia resource in accordance with a command protocol of the NAS device bound to the second user account;
sending the download instruction to the NAS device to begin download of the multimedia resource automatically in accordance with the download instruction; and
causing a display of a popup notification generated by the NAS device on the second instant messaging client device, wherein the popup notification comprises a view entry that retrieves the multimedia resource from the NAS device and plays the multimedia resource after the view entry is triggered, wherein the multimedia resource from the NAS device is played independently of the first user account.

9. The server of claim 8, wherein sending the download instruction to the NAS device includes:
sending the download instruction to the second instant messaging client device over the Internet with a request for the second instant messaging client device to forward the download instruction to the NAS device via a local area network linking the second instant messaging client device and the NAS device, wherein the second instant messaging client device sends the download instruction to the NAS device via the local area network according to the request without requiring further instruction from a user of the second instant messaging client device.

10. The server of claim 8, wherein the operations include:
in response to receiving the first instant messaging message:
in accordance with a determination that the first instant messaging message includes a download address of a multimedia resource, and that the second user account is bound to a network attached storage (NAS) device:
generating a playback instruction in accordance with a command protocol of a playing device bound to the second user account; and
sending the playback instruction to the NAS device with a request to forward the playback instruction to the playing device that is bound to the second user account when download of the multimedia resource is completed at the NAS device, wherein the NAS device forwards the playback instruction to the playing device after the download of the multimedia resource is completed at the NAS device without requiring further instruction from a user of the second instant messaging client device or a user of the NAS device.

11. The server of claim 10, wherein the playback instruction includes one or more predefined playback times, and wherein the playing device generates a prompt requesting user confirmation of the playback of the multimedia resource in accordance with the one or more predefined playback times.

12. The server of claim 11, wherein the playback instruction includes reading access permission to the playing device to access the multimedia resource at the NAS device.

13. The server of claim 8, wherein the operations include:
after sending the download instruction to the NAS device, receiving a download completion message from the NAS device regarding completion of download of the multimedia resource at the NAS device; and
in response to receiving the download completion message from the NAS device, and in accordance with a determination that the second user account is bound to a playing device that is distinct from the NAS device and the second instant messaging client device:
generating a playback instruction in accordance with a command protocol of the playing device bound to the second user account; and
sending the playback instruction to the playing device, wherein the playing device plays back the multimedia resource in accordance with the playback instruction.

14. The server of claim 13, wherein the operations include:
after sending the playback instruction to the playing device, receiving a playback acceptance message from the playing device regarding playback of the multimedia resource at the playing device; and in response to receiving the playback acceptance message from the playing device:
: generating a second instant messaging message addressed to the first user account regarding playback of the multimedia resource; and
sending the second instant messaging message to the first instant messaging client device corresponding to the first user account, wherein the first instant messaging client device displays the second instant messaging message in a conversation interface for an instant messaging conversation between the first user account and the second user account.

15. A non-transitory computer-readable storage medium storing a plurality of instructions configured for execution by a server having one or more processors, wherein the server is configured to communicate with a plurality of instant messaging client devices and to support instant messaging among the plurality of instant messaging client devices and wherein the plurality of instructions can cause the server to perform the following operations:
: receiving a first instant messaging message sent by a first instant messaging client corresponding to a first user account at a first instant messaging client device, the first instant messaging message being addressed to a second instant messaging client corresponding to a second user account at a second instant messaging client device that is distinct from the first user account, and the first instant messaging message including a download address of a multimedia resource provided by the first user account;
in response to receiving the first instant messaging message from the first instant messaging client:
: forwarding the first instant messaging message to a second instant messaging client device corresponding to the second user account;
in accordance with a determination that the first instant messaging message includes a download address of a multimedia resource, and that the second user account is bound to a network attached storage (NAS) device, wherein the second user account is bound to the NAS device when (i) the NAS is registered in the server as an associated device under the second user account or (ii) the second instant messaging client device has read and/or write privileges on the NAS device:
: generating a download instruction according to the download address of the multimedia resource in accordance with a command protocol of the NAS device bound to the second user account;
sending the download instruction to the NAS device to begin download of the multimedia resource automatically in accordance with the download instruction; and
causing a display of a popup notification generated by the NAS device on the second instant messaging client device, wherein the popup notification comprises a view entry that retrieves the multimedia resource from the NAS device and plays the multimedia resource after the view entry is triggered, wherein the multimedia resource from the NAS device is played independently of the first user account.

16. The non-transitory computer-readable storage medium of claim 15, wherein sending the download instruction to the NAS device includes:
: sending the download instruction to the second instant messaging client device over the Internet with a request for the second instant messaging client device to forward the download instruction to the NAS device via a local area network linking the second instant messaging client device and the NAS device, wherein the second instant messaging client device sends the download instruction to the NAS device via the local area network according to the request without requiring further instruction from a user of the second instant messaging client device.

17. The non-transitory computer-readable storage medium of claim 15, wherein the operations include:
: in response to receiving the first instant messaging message:
: in accordance with a determination that the first instant messaging message includes a download address of a multimedia resource, and that the second user account is bound to a network attached storage (NAS) device:
: generating a playback instruction in accordance with a command protocol of a playing device bound to the second user account; and
sending the playback instruction to the NAS device with a request to forward the playback instruction to the playing device that is bound to the second user account when download of the multimedia resource is completed at the NAS device, wherein the NAS device forwards the playback instruction to the playing device after the download of the multimedia resource is completed at the NAS device without requiring further instruction from a user of the second instant messaging client device or a user of the NAS device.

18. The non-transitory computer-readable storage medium of claim 17, wherein the playback instruction includes one or more predefined playback times, and wherein the playing device generates a prompt requesting user confirmation of the playback of the multimedia resource in accordance with the one or more predefined playback times.

19. The non-transitory computer-readable storage medium of claim 18, wherein the playback instruction includes reading access permission to the playing device to access the multimedia resource at the NAS device.

20. The non-transitory computer-readable storage medium of claim 19, wherein the operations include:
: after sending the download instruction to the NAS device, receiving a download completion message from the NAS device regarding completion of download of the multimedia resource at the NAS device; and
in response to receiving the download completion message from the NAS device, and in accordance with a determination that the second user account is bound to a playing device that is distinct from the NAS device and the second instant messaging client device:
: generating a playback instruction in accordance with a command protocol of the playing device bound to the second user account; and
sending the playback instruction to the playing device, wherein the playing device plays back the multimedia resource in accordance with the playback instruction.

* * * * *